United States Patent
Ohtsuka et al.

(10) Patent No.: US 12,379,140 B2
(45) Date of Patent: Aug. 5, 2025

(54) AIR CONDITIONER

(71) Applicant: DAIKIN INDUSTRIES, LTD., Osaka (JP)

(72) Inventors: Keisuke Ohtsuka, Osaka (JP); Mitsushi Itano, Osaka (JP); Daisuke Karube, Osaka (JP); Yuuki Yotsumoto, Osaka (JP); Kazuhiro Takahashi, Osaka (JP); Tetsushi Tsuda, Osaka (JP)

(73) Assignee: DAIKIN INDUSTRIES., LTD., Osaka (JP)

( * ) Notice: Subject to any disclaimer, the term of this patent is extended or adjusted under 35 U.S.C. 154(b) by 315 days.

(21) Appl. No.: 18/078,559

(22) Filed: Dec. 9, 2022

(65) Prior Publication Data

US 2023/0117208 A1    Apr. 20, 2023

Related U.S. Application Data

(63) Continuation-in-part of application No. 16/913,454, filed on Jun. 26, 2020, which is a continuation-in-part
(Continued)

(30) Foreign Application Priority Data

Dec. 18, 2017 (JP) .................. 2017-242183
Dec. 18, 2017 (JP) .................. 2017-242185
(Continued)

(51) Int. Cl.
*F25B 31/02* (2006.01)
*C09K 5/04* (2006.01)

(52) U.S. Cl.
CPC ............ *F25B 31/026* (2013.01); *C09K 5/045* (2013.01); *C09K 2205/122* (2013.01); *C09K 2205/126* (2013.01); *C09K 2205/22* (2013.01)

(58) Field of Classification Search
CPC ........ C09K 2205/122; C09K 2205/126; C09K 2205/22; C09K 2205/40; C09K 5/045;
(Continued)

(56) References Cited

U.S. PATENT DOCUMENTS 5,185,092 A    2/1993    Fukuda et al.
5,344,069 A    9/1994    Narikiyo
(Continued)

FOREIGN PATENT DOCUMENTS

AU    2001284508    3/2002
CN    1288132    3/2001
(Continued)

OTHER PUBLICATIONS

International Preliminary Report on Patentability issued Jun. 23, 2020 in International Application No. PCT/JP2018/045978.
(Continued)

*Primary Examiner* — Henry T Crenshaw
(74) *Attorney, Agent, or Firm* — Wenderoth, Lind & Ponack, L.L.P.

(57) ABSTRACT

In an air conditioner that uses a refrigerant mixture containing at least 1,2-difluoroethylene, high efficiency is achieved. In the air conditioner (1), a compressor (100, 200) can be driven without interposing a power conversion device between an AC power source (90, 190) and a motor (70, 170). Thus, it is possible to provide the air conditioner (1) that is environmentally friendly and has a relatively inexpensive configuration.

13 Claims, 5 Drawing Sheets

Related U.S. Application Data of application No. 16/772,961, filed as application No. PCT/JP2018/046628 on Dec. 18, 2018, now abandoned.

(30) Foreign Application Priority Data

| Dec. 18, 2017 | (JP) | 2017-242186 |
|---|---|---|
| Dec. 18, 2017 | (JP) | 2017-242187 |
| Oct. 5, 2018 | (WO) | PCT/JP2018/037483 |
| Oct. 17, 2018 | (WO) | PCT/JP2018/038746 |
| Oct. 17, 2018 | (WO) | PCT/JP2018/038747 |
| Oct. 17, 2018 | (WO) | PCT/JP2018/038748 |
| Oct. 17, 2018 | (WO) | PCT/JP2018/038749 |

(58) Field of Classification Search
CPC .......... F24F 11/46; F24F 11/88; F25B 13/00; F25B 2313/0293; F25B 2600/021; F25B 31/026; F25B 49/022
See application file for complete search history.

(56) References Cited

U.S. PATENT DOCUMENTS

| | | |
|---|---|---|
| 5,851,968 A | 12/1998 | Schnur |
| 6,591,631 B1 | 7/2003 | Taira |
| 6,667,285 B1 | 12/2003 | Kawahara et al. |
| 8,358,040 B2 | 1/2013 | Komuro et al. |
| 10,131,827 B2 | 11/2018 | Fukushima et al. |
| 10,883,745 B2 | 1/2021 | Higashiiue et al. |
| 2002/0140309 A1 | 10/2002 | Yanashima et al. |
| 2002/0193262 A1 | 12/2002 | Kaimai et al. |
| 2004/0011062 A1 | 1/2004 | Taira |
| 2004/0159115 A1* | 8/2004 | Matsunaga ............... H02P 6/20 62/236 |
| 2006/0000224 A1 | 1/2006 | Matsuoka |
| 2007/0164700 A1* | 7/2007 | Schwarz ................... H02P 1/42 318/778 |
| 2007/0209373 A1 | 9/2007 | Taira et al. |
| 2008/0184723 A1 | 8/2008 | Sato et al. |
| 2008/0184731 A1 | 8/2008 | Sienel et al. |
| 2008/0188173 A1 | 8/2008 | Chen et al. |
| 2009/0241569 A1 | 10/2009 | Okada et al. |
| 2009/0260382 A1 | 10/2009 | Takeichi et al. |
| 2010/0067264 A1 | 3/2010 | Ohashi et al. |
| 2010/0082162 A1 | 4/2010 | Mundy et al. |
| 2010/0122545 A1 | 5/2010 | Minor et al. |
| 2011/0108756 A1 | 5/2011 | Tsuchiya et al. |
| 2011/0167848 A1 | 7/2011 | Wakashima et al. |
| 2011/0253927 A1* | 10/2011 | Minor ...................... F25B 45/00 252/182.29 |
| 2012/0260679 A1 | 10/2012 | Huerta-Ochoa |
| 2014/0070132 A1 | 3/2014 | Fukushima |
| 2014/0077123 A1 | 3/2014 | Fukushima |
| 2014/0291411 A1 | 10/2014 | Tamaki et al. |
| 2014/0314606 A1 | 10/2014 | Maeyama et al. |
| 2014/0373569 A1 | 12/2014 | Tsuboe et al. |
| 2015/0001981 A1 | 1/2015 | Hattori et al. |
| 2015/0075203 A1 | 3/2015 | Mochizuki et al. |
| 2015/0096321 A1 | 4/2015 | Kawano et al. |
| 2015/0143841 A1 | 5/2015 | Kawano et al. |
| 2015/0171775 A1 | 6/2015 | Cho et al. |
| 2015/0256038 A1 | 9/2015 | Nigo et al. |
| 2015/0362199 A1 | 12/2015 | Yumoto et al. |
| 2015/0376486 A1 | 12/2015 | Hashimoto et al. |
| 2016/0018135 A1 | 1/2016 | Yuzawa et al. |
| 2016/0047579 A1 | 2/2016 | Yan et al. |
| 2016/0075927 A1 | 3/2016 | Fukushima |
| 2016/0131378 A1* | 5/2016 | Hinokuma ............... F24F 11/64 62/157 |
| 2016/0276886 A1 | 9/2016 | Baba et al. |
| 2016/0333241 A1 | 11/2016 | Fukushima et al. |
| 2016/0333243 A1 | 11/2016 | Fukushima et al. |
| 2016/0340565 A1 | 11/2016 | Tasaka et al. |
| 2016/0348933 A1 | 12/2016 | Takeuchi et al. |
| 2016/0355719 A1 | 12/2016 | Fukushima et al. |
| 2017/0002245 A1 | 1/2017 | Fukushima |
| 2017/0058172 A1 | 3/2017 | Fukushima et al. |
| 2017/0058173 A1 | 3/2017 | Fukushima |
| 2017/0058174 A1 | 3/2017 | Fukushima et al. |
| 2017/0121581 A1 | 5/2017 | Horiike et al. |
| 2017/0138642 A1 | 5/2017 | Ueno et al. |
| 2017/0166831 A1 | 6/2017 | Matsumoto |
| 2017/0248328 A1 | 8/2017 | Eskew et al. |
| 2017/0328586 A1 | 11/2017 | Maeyama |
| 2017/0336085 A1 | 11/2017 | Yasuo et al. |
| 2017/0338707 A1 | 11/2017 | Shono et al. |
| 2018/0094844 A1 | 4/2018 | Suzuki |
| 2018/0051198 A1 | 5/2018 | Okamoto et al. |
| 2018/0138763 A1 | 5/2018 | Nakamura et al. |
| 2018/0156217 A1 | 6/2018 | Sakima et al. |
| 2018/0156511 A1 | 6/2018 | Chikami et al. |
| 2018/0254676 A1 | 9/2018 | Nigo et al. |
| 2018/0299175 A1 | 10/2018 | Hayamizu et al. |
| 2018/0320942 A1 | 11/2018 | Hayamizu et al. |
| 2018/0328596 A1 | 11/2018 | Hatanaka et al. |
| 2018/0331436 A1 | 11/2018 | Hayamizu et al. |
| 2018/0358861 A1 | 12/2018 | Hayamizu et al. |
| 2018/0363965 A1 | 12/2018 | Hayamizu et al. |
| 2019/0063773 A1 | 2/2019 | Nagahashi et al. |
| 2019/0068015 A1 | 2/2019 | Yabe et al. |
| 2019/0309963 A1 | 10/2019 | Zaki et al. |
| 2020/0079985 A1 | 3/2020 | Okamoto et al. |
| 2020/0321816 A1 | 10/2020 | Watanabe |
| 2020/0325375 A1 | 10/2020 | Kumakura et al. |
| 2020/0325376 A1 | 10/2020 | Kumakura et al. |
| 2020/0325377 A1 | 10/2020 | Kumakura et al. |
| 2020/0326100 A1 | 10/2020 | Ukibune et al. |
| 2020/0326101 A1 | 10/2020 | Itano et al. |
| 2020/0326102 A1 | 10/2020 | Kumakura et al. |
| 2020/0326103 A1 | 10/2020 | Kumakura et al. |
| 2020/0326105 A1 | 10/2020 | Kumakura et al. |
| 2020/0326109 A1 | 10/2020 | Kumakura et al. |
| 2020/0326110 A1 | 10/2020 | Asano et al. |
| 2020/0332164 A1 | 10/2020 | Itano et al. |
| 2020/0332166 A1 | 10/2020 | Kumakura et al. |
| 2020/0333041 A1 | 10/2020 | Itano et al. |
| 2020/0333054 A1 | 10/2020 | Asano et al. |
| 2020/0347283 A1 | 11/2020 | Itano et al. |
| 2020/0363085 A1 | 11/2020 | Itano et al. |
| 2020/0363105 A1 | 11/2020 | Kumakura et al. |
| 2020/0363106 A1 | 11/2020 | Itano et al. |
| 2020/0363112 A1 | 11/2020 | Ohtsuka et al. |
| 2020/0369934 A1 | 11/2020 | Itano et al. |
| 2020/0385620 A1 | 12/2020 | Itano et al. |
| 2020/0385621 A1 | 12/2020 | Itano et al. |
| 2020/0385622 A1 | 12/2020 | Itano et al. |
| 2020/0392387 A1 | 12/2020 | Ohtsuka et al. |
| 2020/0392388 A1 | 12/2020 | Itano et al. |
| 2020/0393178 A1 | 12/2020 | Kumakura et al. |
| 2021/0018191 A1 | 1/2021 | Itano et al. |
| 2021/0135520 A1 | 5/2021 | Shimokawa et al. |
| 2021/0163804 A1 | 6/2021 | Kumakura et al. |
| 2021/0189209 A1 | 6/2021 | Yotdumoto et al. |
| 2021/0222040 A1 | 7/2021 | Fukushima et al. |
| 2021/0355359 A1 | 11/2021 | Ohkubo et al. |
| 2022/0214085 A1 | 7/2022 | Kumakura et al. |
| 2022/0389299 A1 | 12/2022 | Itano et al. |
| 2022/0404070 A1 | 12/2022 | Ohtsuka et al. |
| 2023/0002659 A1 | 1/2023 | Itano et al. |
| 2023/0110292 A1 | 4/2023 | Itano |

FOREIGN PATENT DOCUMENTS

| | | |
|---|---|---|
| CN | 1447491 | 10/2003 |
| CN | 1455855 | 11/2003 |
| CN | 1723373 | 1/2006 |
| CN | 1987264 | 6/2007 |
| CN | 101235815 | 8/2008 |
| CN | 101441012 | 5/2009 |
| CN | 102401519 | 4/2012 |
| CN | 103562338 | 2/2014 |
| CN | 203704143 | 7/2014 |

(56) References Cited

FOREIGN PATENT DOCUMENTS

| | | |
|---|---|---|
| CN | 103975204 | 8/2014 |
| CN | 104094069 | 10/2014 |
| CN | 104456760 | 3/2015 |
| CN | 104578493 | 4/2015 |
| CN | 204534884 | 8/2015 |
| CN | 104903661 | 9/2015 |
| CN | 104937350 | 9/2015 |
| CN | 204648544 | 9/2015 |
| CN | 105102905 | 11/2015 |
| CN | 204943959 | 1/2016 |
| CN | 205261858 | 5/2016 |
| CN | 106029821 | 10/2016 |
| CN | 106030222 | 10/2016 |
| CN | 106062159 | 10/2016 |
| CN | 106085363 | 11/2016 |
| CN | 106103992 | 11/2016 |
| CN | 106133110 | 11/2016 |
| CN | 106414653 | 2/2017 |
| CN | 106414654 | 2/2017 |
| CN | 106415152 | 2/2017 |
| CN | 106574802 | 4/2017 |
| CN | 106661477 | 5/2017 |
| CN | 106839496 | 6/2017 |
| CN | 107110570 | 8/2017 |
| CN | 107112830 | 8/2017 |
| CN | 107429957 | 12/2017 |
| CN | 107614980 | 1/2018 |
| CN | 107925285 | 4/2018 |
| CN | 108139112 | 6/2018 |
| CN | 108431414 | 8/2018 |
| CN | 108469126 | 8/2018 |
| EP | 1 231 255 | 8/2002 |
| EP | 1 246 348 | 10/2002 |
| EP | 1 326 057 | 7/2003 |
| EP | 1 632 732 | 3/2006 |
| EP | 1 953 388 | 8/2008 |
| EP | 2 423 609 | 2/2012 |
| EP | 2 620 736 | 7/2013 |
| EP | 2 711 405 | 3/2014 |
| EP | 2 789 933 | 10/2014 |
| EP | 2 840 335 | 2/2015 |
| EP | 2 853 826 | 4/2015 |
| EP | 2 918 953 | 9/2015 |
| EP | 2 952 828 | 12/2015 |
| EP | 2 980 508 | 2/2016 |
| EP | 3 012 555 | 4/2016 |
| EP | 3 012 557 | 4/2016 |
| EP | 3 070 417 | 9/2016 |
| EP | 3 101 082 | 12/2016 |
| EP | 3 109 302 | 12/2016 |
| EP | 3 115 716 | 1/2017 |
| EP | 3 121 242 | 1/2017 |
| EP | 3 128 259 | 2/2017 |
| EP | 3 147 595 | 3/2017 |
| EP | 3 153 559 | 4/2017 |
| EP | 3 153 561 | 4/2017 |
| EP | 3 170 881 | 5/2017 |
| EP | 3 222 934 | 9/2017 |
| EP | 3 249 309 | 11/2017 |
| EP | 3 299 731 | 3/2018 |
| EP | 3 358 272 | 8/2018 |
| EP | 3 358 278 | 8/2018 |
| EP | 3 399 189 | 11/2018 |
| EP | 3 795 925 | 3/2021 |
| GB | 2530915 | 4/2016 |
| JP | 51-90115 | 7/1976 |
| JP | 52-13025 | 4/1977 |
| JP | 57-198968 | 12/1982 |
| JP | 59-39790 | 3/1984 |
| JP | 62-69066 | 3/1987 |
| JP | 63-69066 | 3/1987 |
| JP | 2-4163 | 1/1990 |
| JP | 5-264070 | 10/1993 |
| JP | 5-272823 | 10/1993 |
| JP | 7-19627 | 1/1995 |
| JP | 7-190571 | 7/1995 |
| JP | 8-200273 | 8/1996 |
| JP | 10-46170 | 2/1998 |
| JP | 10-300292 | 11/1998 |
| JP | 10-309050 | 11/1998 |
| JP | 10-318564 | 12/1998 |
| JP | 11-206001 | 7/1999 |
| JP | 11-256358 | 9/1999 |
| JP | 2000-161805 | 6/2000 |
| JP | 2000-220877 | 8/2000 |
| JP | 2000-234767 | 8/2000 |
| JP | 2000-304302 | 11/2000 |
| JP | 2001-82755 | 3/2001 |
| JP | 2001-139972 | 5/2001 |
| JP | 2002-54888 | 2/2002 |
| JP | 2002-89978 | 3/2002 |
| JP | 2002-257366 | 9/2002 |
| JP | 2002-272043 | 9/2002 |
| JP | 2002-286286 | 10/2002 |
| JP | 2002-318028 | 10/2002 |
| JP | 2003-18776 | 1/2003 |
| JP | 2003-83614 | 3/2003 |
| JP | 2003-174794 | 6/2003 |
| JP | 2004-28035 | 1/2004 |
| JP | 2004-132647 | 4/2004 |
| JP | 2004-215406 | 7/2004 |
| JP | 2004-251535 | 9/2004 |
| JP | 2004-361036 | 12/2004 |
| JP | 2005-61711 | 3/2005 |
| JP | 2005-241045 | 9/2005 |
| JP | 2005-288502 | 10/2005 |
| JP | 2006-46737 | 2/2006 |
| JP | 2006-162197 | 6/2006 |
| JP | 2006-211824 | 8/2006 |
| JP | 2006-313027 | 11/2006 |
| JP | 2008-39305 | 2/2008 |
| JP | 2008-54488 | 3/2008 |
| JP | 2008-190377 | 8/2008 |
| JP | 2008-245384 | 10/2008 |
| JP | 2008-286422 | 11/2008 |
| JP | 2009-63216 | 3/2009 |
| JP | 2009-92274 | 4/2009 |
| JP | 2009-92289 | 4/2009 |
| JP | 2009-121654 | 6/2009 |
| JP | 2009-150620 | 7/2009 |
| JP | 2009-243793 | 10/2009 |
| JP | 2009-299975 | 12/2009 |
| JP | 2010-28985 | 2/2010 |
| JP | 2010-103346 | 5/2010 |
| JP | 2010-119190 | 5/2010 |
| JP | 2010-164222 | 7/2010 |
| JP | 2010-230242 | 10/2010 |
| JP | 2011-4449 | 1/2011 |
| JP | 2011-43304 | 3/2011 |
| JP | 2011-52884 | 3/2011 |
| JP | 2011-94841 | 5/2011 |
| JP | 2011-135638 | 7/2011 |
| JP | 2011-202738 | 10/2011 |
| JP | 2011-252636 | 12/2011 |
| JP | 2012-42169 | 3/2012 |
| JP | 2012-112617 | 6/2012 |
| JP | 2012-132637 | 7/2012 |
| JP | 2012-151969 | 8/2012 |
| JP | 2013-124848 | 6/2013 |
| JP | 2013-126281 | 6/2013 |
| JP | 2013-139990 | 7/2013 |
| JP | 2013-155892 | 8/2013 |
| JP | 2013-155921 | 8/2013 |
| JP | 2013-172615 | 9/2013 |
| JP | 2013-200090 | 10/2013 |
| JP | 2013-221671 | 10/2013 |
| JP | 2014-70840 | 4/2014 |
| JP | 2014-75971 | 4/2014 |
| JP | 2014-89004 | 5/2014 |
| JP | 2014-129543 | 7/2014 |
| JP | 2014-152999 | 8/2014 |
| JP | 2014-167381 | 9/2014 |
| JP | 2015-23721 | 2/2015 |
| JP | 2015-55455 | 3/2015 |

(56) References Cited

FOREIGN PATENT DOCUMENTS

| | | |
|---|---|---|
| JP | 2015-78789 | 4/2015 |
| JP | 2015-82875 | 4/2015 |
| JP | 2015-111012 | 6/2015 |
| JP | 2015-114082 | 6/2015 |
| JP | 2015-145765 | 8/2015 |
| JP | 2015-158282 | 9/2015 |
| JP | 2015-218909 | 12/2015 |
| JP | 2015-218912 | 12/2015 |
| JP | 2015-229767 | 12/2015 |
| JP | 2016-1062 | 1/2016 |
| JP | 2016-11423 | 1/2016 |
| JP | 2016-56340 | 4/2016 |
| JP | 2016-125808 | 7/2016 |
| JP | 2016-133256 | 7/2016 |
| JP | 2016-172869 | 9/2016 |
| JP | 2016-174461 | 9/2016 |
| JP | 2017-36861 | 2/2017 |
| JP | 2017-46430 | 3/2017 |
| JP | 2017-53285 | 3/2017 |
| JP | 2017-67373 | 4/2017 |
| JP | 2017-67428 | 4/2017 |
| JP | 2017-122549 | 7/2017 |
| JP | 2017-145975 | 8/2017 |
| JP | 2017-192190 | 10/2017 |
| JP | 2018-25377 | 2/2018 |
| JP | 6524995 | 6/2019 |
| KR | 2001-0029975 | 4/2001 |
| KR | 10-2001-0064286 | 7/2001 |
| KR | 2003-0028838 | 4/2003 |
| KR | 10-0939609 | 10/2003 |
| KR | 10-2004-0075737 | 8/2004 |
| KR | 10-2005-0044931 | 5/2005 |
| KR | 10-2013-0111186 | 10/2013 |
| KR | 10-2015-0067654 | 6/2015 |
| KR | 10-2017-0034887 | 3/2017 |
| RU | 2013 156 380 | 6/2015 |
| TW | 20030103482 | 2/2003 |
| WO | 01/36571 | 5/2001 |
| WO | 02/23100 | 3/2002 |
| WO | 2009/069679 | 6/2009 |
| WO | 2009/093345 | 7/2009 |
| WO | 2012/157764 | 11/2012 |
| WO | WO 2012-157765 | * 11/2012 |
| WO | 2013/084301 | 6/2013 |
| WO | 2013/146103 | 10/2013 |
| WO | 2013/146208 | 10/2013 |
| WO | 2013/151043 | 10/2013 |
| WO | 2014/045400 | 3/2014 |
| WO | 2014/118945 | 8/2014 |
| WO | 2014/119149 | 8/2014 |
| WO | 2014/156190 | 10/2014 |
| WO | 2014/203353 | 12/2014 |
| WO | 2014/203354 | 12/2014 |
| WO | 2015/071967 | 5/2015 |
| WO | 2015/115252 | 8/2015 |
| WO | 2015/125763 | 8/2015 |
| WO | 2015/125884 | 8/2015 |
| WO | 2015/136981 | 9/2015 |
| WO | 2015/140827 | 9/2015 |
| WO | 2015/141678 | 9/2015 |
| WO | 2015/186557 | 12/2015 |
| WO | 2015/186670 | 12/2015 |
| WO | 2016/009884 | 1/2016 |
| WO | 2016/017460 | 2/2016 |
| WO | 2016/103711 | 6/2016 |
| WO | 2016/104418 | 6/2016 |
| WO | 2016/117443 | 7/2016 |
| WO | 2016/157538 | 10/2016 |
| WO | 2016/182030 | 11/2016 |
| WO | 2016/190232 | 12/2016 |
| WO | 2017/038489 | 3/2017 |
| WO | 2017/056789 | 4/2017 |
| WO | 2017/057004 | 4/2017 |
| WO | 2017/115636 | 7/2017 |
| WO | 2017/122517 | 7/2017 |
| WO | 2017/145826 | 8/2017 |
| WO | 2017/195248 | 11/2017 |
| WO | 2019/123782 | 6/2019 |
| WO | 2019/123804 | 6/2019 |
| WO | 2019/123805 | 6/2019 |
| WO | 2019/123806 | 6/2019 |
| WO | 2019/123807 | 6/2019 |
| WO | 2019/124400 | 6/2019 |
| WO | 2019/124401 | 6/2019 |
| WO | 2019/124402 | 6/2019 |
| WO | 2019/124403 | 6/2019 |
| WO | 2019/124404 | 6/2019 |

OTHER PUBLICATIONS

International Search Report issued Mar. 19, 2019 in International Application No. PCT/JP2018/045978.
International Preliminary Report on Patentability issued Jun. 23, 2020 in International Application No. PCT/JP2018/046532.
International Search Report issued Feb. 12, 2019 in International Application No. PCT/JP2018/046532.
International Preliminary Report on Patentability issued Jun. 23, 2020 in International Application No. PCT/JP2018/042027.
International Search Report issued Feb. 12, 2019 in International Application No. PCT/JP2018/042027.
International Preliminary Report on Patentability issued Jun. 23, 2020 in International Application No. PCT/JP2018/042032.
International Search Report issued Feb. 19, 2019 in International Application No. PCT/JP2018/042032.
International Preliminary Report on Patentability issued Jun. 23, 2020 in International Application No. PCT/JP2018/046666.
International Search Report issued Apr. 2, 2019 in International Application No. PCT/JP2018/046666.
International Preliminary Report on Patentability issued Jun. 23, 2020 in International Application No. PCT/JP2018/045336.
International Search Report issued Feb. 19, 2019 in International Application No. PCT/JP2018/045336.
International Preliminary Report on Patentability issued Jun. 23, 2020 in International Application No. PCT/JP2018/045557.
International Search Report issued Mar. 12, 2019 in International Application No. PCT/JP2018/045557.
International Preliminary Report on Patentability issued Jun. 23, 2020 in International Application No. PCT/JP2018/046426.
International Search Report issued Feb. 19, 2019 in International Application No. PCT/JP2018/046426.
International Preliminary Report on Patentability issued Jun. 23, 2020 in International Application No. PCT/JP2018/046427.
International Search Report issued Feb. 19, 2019 in International Application No. PCT/JP2018/046427.
International Preliminary Report on Patentability issued Jun. 23, 2020 in International Application No. PCT/JP2018/046428.
International Search Report issued Mar. 19, 2019 in International Application No. PCT/JP2018/046428.
International Preliminary Report on Patentability issued Jun. 23, 2020 in International Application No. PCT/JP2018/046581.
International Search Report issued Mar. 5, 2019 in International Application No. PCT/JP2018/046581.
International Preliminary Report on Patentability issued Jun. 23, 2020 in International Application No. PCT/JP2018/046630.
International Search Report issued Mar. 5, 2019 in International Application No. PCT/JP2018/046630.
International Preliminary Report on Patentability issued Jun. 23, 2020 in International Application No. PCT/JP2018/046582.
International Search Report issued Mar. 5, 2019 in International Application No. PCT/JP2018/046582.
International Preliminary Report on Patentability issued Jun. 23, 2020 in International Application No. PCT/JP2018/046631.
International Search Report issued Mar. 5, 2019 in International Application No. PCT/JP2018/046631.
International Preliminary Report on Patentability issued Jun. 23, 2020 in International Application No. PCT/JP2018/046627.
International Search Report issued Mar. 19, 2019 in International Application No. PCT/JP2018/046627.

(56) References Cited

OTHER PUBLICATIONS

International Preliminary Report on Patentability issued Jun. 23, 2020 in International Application No. PCT/JP2018/046628.
International Search Report issued Mar. 19, 2019 in International Application No. PCT/JP2018/046628.
International Preliminary Report on Patentability issued Jun. 23, 2020 in International Application No. PCT/JP2018/045979.
International Search Report issued Mar. 12, 2019 in International Application No. PCT/JP2018/045979.
International Preliminary Report on Patentability issued Jun. 23, 2020 in International Application No. PCT/JP2018/046434.
International Search Report issued Feb. 19, 2019 in International Application No. PCT/JP2018/046434.
International Preliminary Report on Patentability issued Jun. 23, 2020 in International Application No. PCT/JP2018/045290.
International Search Report issued Jan. 22, 2019 in International Application No. PCT/JP2018/045290.
International Preliminary Report on Patentability issued Jun. 23, 2020 in International Application No. PCT/JP2018/045288.
International Search Report issued Jan. 22, 2019 in International Application No. PCT/JP2018/045288.
International Preliminary Report on Patentability issued Jun. 23, 2020 in International Application No. PCT/JP2018/045289.
International Search Report issued Jan. 22, 2019 in International Application No. PCT/JP2018/045289.
International Preliminary Report on Patentability issued Jun. 23, 2020 in International Application No. PCT/JP2018/046639.
International Preliminary Report on Patentability issued Jun. 23, 2020 in International Application No. PCT/JP2018/046642.
International Preliminary Report on Patentability issued Jun. 23, 2020 in International Application No. PCT/JP2018/038746.
International Preliminary Report on Patentability issued Jun. 23, 2020 in International Application No. PCT/JP2018/046643.
International Preliminary Report on Patentability issued Jun. 23, 2020 in International Application No. PCT/JP2018/038748.
International Preliminary Report on Patentability issued Jun. 23, 2020 in International Application No. PCT/JP2018/046640.
International Preliminary Report on Patentability issued Jun. 23, 2020 in International Application No. PCT/JP2018/046644.
International Preliminary Report on Patentability issued Jun. 23, 2020 in International Application No. PCT/JP2018/038749.
International Preliminary Report on Patentability issued Jun. 23, 2020 in International Application No. PCT/JP2018/037483.
International Search Report issued Feb. 19, 2019 in International Application No. PCT/JP2018/045335.
International Preliminary Report on Patentability issued Jun. 23, 2020 in International Application No. PCT/JP2018/045335.
International Search Report issued Feb. 19, 2019 in International Application No. PCT/JP2018/046435.
International Preliminary Report on Patentability issued Jun. 23, 2020 in International Application No. PCT/JP2018/046435.
International Search Report issued Mar. 19, 2019 in International (PCT) Application No. PCT/JP2018/046530.
International Preliminary Report on Patentability issued Jun. 23, 2020 in International Application No. PCT/JP2018/046530.
International Search Report issued Feb. 12, 2019 in International (PCT) Application No. PCT/JP2018/046533.
International Preliminary Report on Patentability issued Jun. 23, 2020 in International Application No. PCT/JP2018/046533.
Hirahara et al., "Latest trend of alternative refrigerant: LCCP-analogy for HFO-1234yf Air Conditioners using a Simulation with R134a Properties", Refrigeration, Jan. 15, 2010, vol. 85, No. 987, pp. 15-20, with partial translation.
International Preliminary Report on Patentability issued Jun. 23, 2020 in International Application No. PCT/JP2018/038747.
International Search Report issued Mar. 12, 2019 in International (PCT) Application No. PCT/JP2018/046639.
International Search Report issued Mar. 12, 2019 in International (PCT) Application No. PCT/JP2018/046642.
International Search Report issued Dec. 18, 2018 in International (PCT) Application No. PCT/JP2018/038746.
International Search Report issued Mar. 19, 2019 in International (PCT) Application No. PCT/JP2018/046643.
International Search Report issued Dec. 18, 2018 in International (PCT) Application No. PCT/JP2018/038748.
International Search Report issued Mar. 12, 2019 in International (PCT) Application No. PCT/JP2018/046640.
International Search Report issued Mar. 19, 2019 in International (PCT) Application No. PCT/JP2018/046644.
International Search Report issued Dec. 18, 2018 in International (PCT) Application No. PCT/JP2018/038749.
International Search Report issued Dec. 18, 2018 in International (PCT) Application No. PCT/JP2018/037483.
International Search Report issued Dec. 18, 2018 in International (PCT) Application No. PCT/JP2018/038747.
International Search Report issued Mar. 19, 2019 in International Application No. PCT/JP2018/046531.
International Preliminary Report on Patentability issued Jun. 23, 2020 in International Application No. PCT/JP2018/046531.
Summary, Collection of Papers of the 2nd Symposium on New Technologies of Refrigeration and Air Conditioning, 2nd Edition, Ding Guoliang, Ed., published by Shanghai Jiatong University Press, 2003, with Concise Explanation.

\* cited by examiner

AIR CONDITIONER

TECHNICAL FIELD

The present invention relates to an air conditioner that uses refrigerant with a low global warming potential (GWP).

BACKGROUND ART

In recent years, use of refrigerant with a low GWP (hereinafter referred to as low-GWP refrigerant) in air conditioners has been considered from the viewpoint of environmental protection. A dominant example of low-GWP refrigerant is a refrigerant mixture containing 1,2-difluoroethylene.

SUMMARY OF THE INVENTION

Technical Problem

However, the related art giving consideration from the aspect of increasing the efficiency of air conditioners using the foregoing refrigerant is rarely found. For example, in the case of applying the foregoing refrigerant to the air conditioner disclosed in PTL 1 (Japanese Unexamined Patent Application Publication No. 2013-124848), there is an issue of how to achieve high efficiency.

Solution to Problem

An air conditioner according to a first aspect includes a compressor that compresses a refrigerant mixture containing at least 1,2-difluoroethylene, a motor that drives the compressor, and a connection unit that causes power to be supplied from an alternating-current (AC) power source to the motor without frequency conversion.

In the air conditioner that uses a refrigerant mixture containing at least 1,2-difluoroethylene, the compressor can be driven without interposing a power conversion device between the AC power source and the motor. Thus, it is possible to provide the air conditioner that is environmentally friendly and has a relatively inexpensive configuration.

An air conditioner according to a second aspect is the air conditioner according to the first aspect, in which the connection unit directly applies an AC voltage of the AC power source between at least two terminals of the motor.

An air conditioner according to a third aspect is the air conditioner according to the first aspect or the second aspect, in which the AC power source is a single-phase power source.

An air conditioner according to a fourth aspect is the air conditioner according to any one of the first aspect to the third aspect, in which one terminal of the motor is connected in series to an activation circuit.

An air conditioner according to a fifth aspect is the air conditioner according to the fourth aspect, in which the activation circuit is a circuit in which a positive temperature coefficient thermistor and an operation capacitor are connected in parallel to each other.

In the air conditioner that uses a refrigerant mixture containing at least 1,2-difluoroethylene, after the compressor has been activated, the PTC thermistor self-heats and the resistance value thereof increases, and switching to an operation circuit substantially by the operation capacitor occurs. Thus, the compressor enters a state of being capable of outputting a rated torque at appropriate timing.

An air conditioner according to a sixth aspect is the air conditioner according to the first aspect or the second aspect, in which the AC power source is a three-phase power source.

This air conditioner does not require an activation circuit and thus the cost is relatively low.

An air conditioner according to a seventh aspect is the air conditioner according to any one of the first aspect to the sixth aspect, in which the motor is an induction motor.

In this air conditioner, the motor is capable of high output with relatively low cost, and thus the efficiency of the air conditioner can be increased.

An air conditioner according to a twentieth aspect is the air conditioner according to any of the first through seventh aspects, wherein the refrigerant comprises trans-1,2-difluoroethylene (HFO-1132(E)), difluoromethane(R32), and 2,3,3,3-tetrafluoro-1-propene (R1234yf), wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:

point I (72.0, 0.0, 28.0), point J (48.5, 18.3, 33.2), point N (27.7, 18.2, 54.1), and point E (58.3, 0.0, 41.7), or on these line segments (excluding the points on the line segment EI;

the line segment IJ is represented by coordinates $(0.0236y^2-1.7616y+72.0, y, -0.0236y^2+0.7616y+28.0)$;

the line segment NE is represented by coordinates $(0.012y^2-1.9003y+58.3, y, -0.012y^2+0.9003y+41.7)$; and the line segments JN and EI are straight lines.

In the air conditioner that uses a refrigerant mixture containing at least 1,2-difluoroethylene, the compressor can be driven without interposing a power conversion device between the AC power source and the motor. Thus, the air conditioner that is environmentally friendly and has a relatively inexpensive configuration can also be achieved when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

An air conditioner according to a twenty-first aspect is the air conditioner according to any of the first through seventh aspects, wherein the refrigerant comprises HFO-1132(E), R32, and R1234yf, wherein when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:

point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines.

In the air conditioner that uses a refrigerant mixture containing at least 1,2-difluoroethylene, the compressor can be driven without interposing a power conversion device between the AC power source and the motor. Thus, the air conditioner that is environmentally friendly and has a relatively inexpensive configuration can also be achieved when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

An air conditioner according to a twenty-second aspect is the air conditioner according to any of the first through seventh aspects, wherein the refrigerant comprises HFO-1132(E), R32, and R1234yf,
wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line.

In the air conditioner that uses a refrigerant mixture containing at least 1,2-difluoroethylene, the compressor can be driven without interposing a power conversion device between the AC power source and the motor. Thus, the air conditioner that is environmentally friendly and has a relatively inexpensive configuration can also be achieved when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

An air conditioner according to a twenty-third aspect is the air conditioner according to any of the first through seventh aspects, wherein the refrigerant comprises HFO-1132(E), R32, and R1234yf,
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;
the line segment KQ is represented by coordinates $(0.0095y^2-1.2222y+67.676, y, -0.0095y^2+0.2222y+32.324)$; and
the line segment TL is a straight line.

In the air conditioner that uses a refrigerant mixture containing at least 1,2-difluoroethylene, the compressor can be driven without interposing a power conversion device between the AC power source and the motor. Thus, the air conditioner that is environmentally friendly and has a relatively inexpensive configuration can also be achieved when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

An air conditioner according to a twenty-fourth aspect is the air conditioner according to any of the first through seventh aspects, wherein the refrigerant comprises HFO-1132(E), R32, and R1234yf,
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
the line segment PS is represented by coordinates $(0.0064y^2-0.7103y+40.1, y, -0.0064y^2-0.2897y+59.9)$;
the line segment ST is represented by coordinates $(0.0082y^2-1.8683y+83.126, y, -0.0082y^2+0.8683y+16.874)$; and the line segment TP is a straight line.

In the air conditioner that uses a refrigerant mixture containing at least 1,2-difluoroethylene, the compressor can be driven without interposing a power conversion device between the AC power source and the motor. Thus, the air conditioner that is environmentally friendly and has a relatively inexpensive configuration can also be achieved when a refrigerant having a sufficiently low GWP, a refrigeration capacity (may also be referred to as a cooling capacity or a capacity) equal to those of R410A and classified with lower flammability (Class 2L) in the standard of The American Society of Heating, Refrigerating and Air-Conditioning Engineers (ASHRAE) is used.

Figure 1:
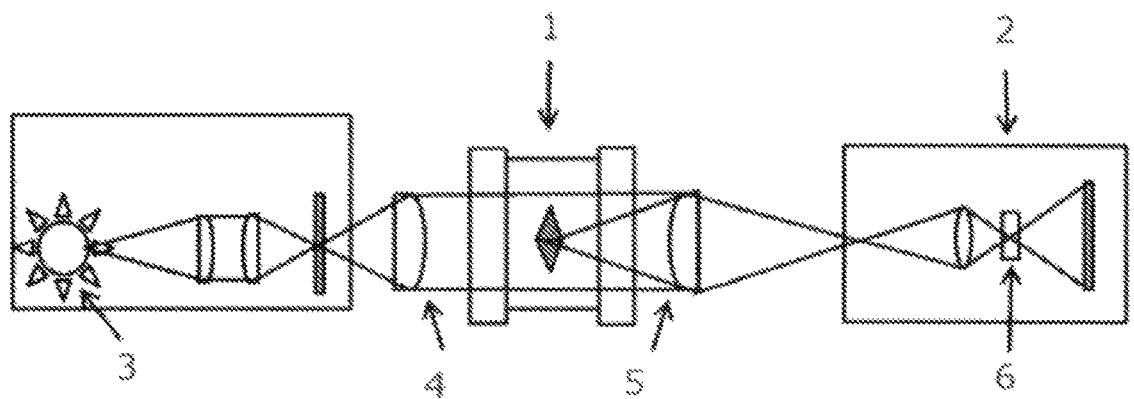
FIG. 1 is a schematic view of an instrument used for a flammability test.

DESCRIPTION OF EMBODIMENTS (1) Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013. Further, in the present specification, a refrigerant having "ASHRAE lower flammability" means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that flammability classification according to the US ANSI/ASHRAE Standard 34-2013 is determined to classified as be "Class 2L."

In the present specification, a refrigerant having an "RCL of x % or more" means that the refrigerant has a refrigerant concentration limit (RCL), calculated in accordance with the US ANSI/ASHRAE Standard 34-2013, of x % or more. RCL refers to a concentration limit in the air in consideration of safety factors. RCL is an index for reducing the risk of acute toxicity, suffocation, and flammability in a closed space where humans are present. RCL is determined in accordance with the ASHRAE Standard. More specifically, RCL is the lowest concentration among the acute toxicity exposure limit (ATEL), the oxygen deprivation limit (ODL), and the flammable concentration limit (FCL), which are respectively calculated in accordance with sections 7.1.1, 7.1.2, and 7.1.3 of the ASHRAE Standard.

In the present specification, temperature glide refers to an absolute value of the difference between the initial temperature and the end temperature in the phase change process of a composition containing the refrigerant of the present disclosure in the heat exchanger of a refrigerant system.

(2) Refrigerant

(2-1) Refrigerant Component

Any one of various refrigerants such as refrigerant D details of these refrigerant are to be mentioned later, can be used as the refrigerant.

(2-2) Use of Refrigerant

The refrigerant according to the present disclosure can be preferably used as a working fluid in a refrigerating machine.

The composition according to the present disclosure is suitable for use as an alternative refrigerant for HFC refrigerant such as R410A, R407C and R404 etc, or HCFC refrigerant such as R22 etc.

(3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

(3-1) Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

(3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. Preferably, a compound that cannot be an impurity inevitably mixed in the refrigerant of the present disclosure is selected as the tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide (N20). The tracer is particularly preferably a hydrofluorocarbon, a hydrochlorofluorocarbon, a chlorofluorocarbon, a fluorocarbon, a hydrochlorocarbon, a fluorocarbon, or a fluoroether.

The following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The tracer compound may be present in the refrigerant composition at a total concentration of about 10 parts per million (ppm) to about 1000 ppm. Preferably, the tracer compound is present in the refrigerant composition at a total concentration of about 30 ppm to about 500 ppm, and most preferably, the tracer compound is present at a total concentration of about 50 ppm to about 300 ppm.

(3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

(3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

(3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

(4) Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

(4-1) Refrigeration Oil

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

(4-2) Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(5) Various Refrigerants

Hereinafter, the refrigerants which are the refrigerants used in the present embodiment, will be described in detail.

(5-4) Refrigerant D

The refrigerant D according to the present disclosure is a mixed refrigerant comprising trans-1,2-difluoroethylene (HFO-1132(E)), difluoromethane (R32), and 2,3,3,3-tetrafluoro-1-propene (R1234yf).

The refrigerant D according to the present disclosure has various properties that are desirable as an R410A-alternative refrigerant; i.e., a refrigerating capacity equivalent to that of R410A, a sufficiently low GWP, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:

point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI);
the line segment IJ is represented by coordinates $(0.0236y^2-1.7616y+72.0,\ y,\ -0.0236y^2+0.7616y+28.0)$;
the line segment NE is represented by coordinates $(0.012y^2-1.9003y+58.3,\ y,\ -0.012y^2+0.9003y+41.7)$; and the line segments JN and EI are straight lines. When the requirements above are satisfied, the refrigerant according to the present disclosure has a refrigerating capacity ratio of 80% or more relative to R410A, a GWP of 125 or less, and a WCF lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines. When the requirements above are satisfied, the refrigerant according to the present disclosure has a refrigerating capacity ratio of 70% or more relative to R410A, a GWP of 125 or less, and an ASHRAE lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line. When the requirements above are satisfied, the refrigerant according to the present disclosure has a refrigerating capacity ratio of 80% or more relative to R410A, a GWP of 250 or less, and an ASHRAE lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;
the line segment KQ is represented by coordinates $(0.0095y^2-1.2222y+67.676, y, -0.0095y^2+0.2222y+32.324)$; and
the line segment TL is a straight line. When the requirements above are satisfied, the refrigerant according to the present disclosure has a refrigerating capacity ratio of 92.5% or more relative to R410A, a GWP of 350 or less, and a WCF lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
the line segment PS is represented by coordinates $(0.0064y^2-0.7103y+40.1, y, -0.0064y^2-0.2897y+59.9)$;
the line segment ST is represented by coordinates $(0.0082y^2-1.8683y+83.126, y, -0.0082y^2+0.8683y+16.874)$; and
the line segment TP is a straight line. When the requirements above are satisfied, the refrigerant according to the present disclosure has a refrigerating capacity ratio of 92.5% or more relative to R410A, a GWP of 350 or less, and an ASHRAE lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ac, cf, fd, and da that connect the following 4 points:
point a (71.1, 0.0, 28.9),
point c (36.5, 18.2, 45.3),
point f (47.6, 18.3, 34.1), and
point d (72.0, 0.0, 28.0),
or on these line segments;
the line segment ac is represented by coordinates $(0.0181y^2-2.2288y+71.096, y, -0.0181y^2+1.2288y+28.904)$;

the line segment fd is represented by coordinates ($0.02y^2 - 1.7y + 72$, y, $-0.02y^2 + 0.7y + 28$); and the line segments cf and da are straight lines. When the requirements above are satisfied, the refrigerant according to the present disclosure has a refrigerating capacity ratio of 85% or more relative to R410A, a GWP of 125 or less, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ab, be, ed, and da that connect the following 4 points:

point a (71.1, 0.0, 28.9),
point b (42.6, 14.5, 42.9),
point e (51.4, 14.6, 34.0), and
point d (72.0, 0.0, 28.0),
or on these line segments;

the line segment ab is represented by coordinates ($0.0181y^2 - 2.2288y + 71.096$, y, $-0.0181y^2 + 1.2288y + 28.904$);

the line segment ed is represented by coordinates ($0.02y^2 - 1.7y + 72$, y, $-0.02y^2 + 0.7y + 28$); and the line segments be and da are straight lines. When the requirements above are satisfied, the refrigerant according to the present disclosure has a refrigerating capacity ratio of 85% or more relative to R410A, a GWP of 100 or less, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gi, ij, and jg that connect the following 3 points:

point g (77.5, 6.9, 15.6),
point i (55.1, 18.3, 26.6), and
point j (77.5. 18.4, 4.1),
or on these line segments;

the line segment gi is represented by coordinates ($0.02y^2 - 2.4583y + 93.396$, y, $-0.02y^2 + 1.4583y + 6.604$); and the line segments ij and jg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gh, hk, and kg that connect the following 3 points:

point g (77.5, 6.9, 15.6),
point h (61.8, 14.6, 23.6), and
point k (77.5, 14.6, 7.9),
or on these line segments;

the line segment gh is represented by coordinates ($0.02y^2 - 2.4583y + 93.396$, y, $-0.02y^2 + 1.4583y + 6.604$); and the line segments hk and kg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure may further comprise other additional refrigerants in addition to HFO-1132(E), R32, and R1234yf, as long as the above properties and effects are not impaired. In this respect, the refrigerant according to the present disclosure preferably comprises HFO-1132(E), R32, and R1234yf in a total amount of 99.5 mass % or more, more preferably 99.75 mass % or more, and still more preferably 99.9 mass % or more based on the entire refrigerant.

Such additional refrigerants are not limited, and can be selected from a wide range of refrigerants. The mixed refrigerant may comprise a single additional refrigerant, or two or more additional refrigerants.

Examples of Refrigerant D

The present disclosure is described in more detail below with reference to Examples of refrigerant D. However, the refrigerant D is not limited to the Examples.

The composition of each mixed refrigerant of HFO-1132(E), R32, and R1234yf was defined as WCF. A leak simulation was performed using the NIST Standard Reference Database REFLEAK Version 4.0 under the conditions of Equipment, Storage, Shipping, Leak, and Recharge according to the ASHRAE Standard 34-2013. The most flammable fraction was defined as WCFF.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC. Tables 113 to 115 show the results.

TABLE 113

| Item | | Unit | Comparative Example 13 I | Example 11 | Example 12 J | Example 13 | Example 14 K | Example 15 | Example 16 L |
|---|---|---|---|---|---|---|---|---|---|
| WCF | HFO-1132(E) | Mass % | 72 | 57.2 | 48.5 | 41.2 | 35.6 | 32 | 28.9 |
| | R32 | Mass % | 0 | 10 | 18.3 | 27.6 | 36.8 | 44.2 | 51.7 |
| | R1234yf | Mass % | 28 | 32.8 | 33.2 | 31.2 | 27.6 | 23.8 | 19.4 |
| Burning Velocity (WCF) | | cm/s | 10 | 10 | 10 | 10 | 10 | 10 | 10 |

TABLE 114

| Item | | Unit | Comparative Example 14 M | Example 18 | Example 19 W | Example 20 | Example 21 N | Example 22 |
|---|---|---|---|---|---|---|---|---|
| WCF | HFO-1132(E) | Mass % | 52.6 | 39.2 | 32.4 | 29.3 | 27.7 | 24.6 |
| | R32 | Mass % | 0.0 | 5.0 | 10.0 | 14.5 | 18.2 | 27.6 |
| | R1234yf | Mass % | 47.4 | 55.8 | 57.6 | 56.2 | 54.1 | 47.8 |
| | Leak condition that results in WCFF | | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side |
| WCF | HFO-1132(E) | Mass % | 72.0 | 57.8 | 48.7 | 43.6 | 40.6 | 34.9 |
| | R32 | Mass % | 0.0 | 9.5 | 17.9 | 24.2 | 28.7 | 38.1 |
| | R1234yf | Mass % | 28.0 | 32.7 | 33.4 | 32.2 | 30.7 | 27.0 |
| Burning Velocity (WCF) | | cm/s | 8 or less | 8 or less | 8 or less | 8 or less | 8 or less | 8 or less |
| Burning Velocity (WCFF) | | cm/s | 10 | 10 | 10 | 10 | 10 | 10 |

TABLE 115

| Item | | Unit | Example 23 O | Example 24 | Example 25 P |
|---|---|---|---|---|---|
| WCF | HFO-1132 (E) | Mass % | 22.6 | 21.2 | 20.5 |
| | HFO-1123 | Mass % | 36.8 | 44.2 | 51.7 |
| | R1234yf | Mass % | 40.6 | 34.6 | 27.8 |
| | Leak condition that results in WCFF | | Storage, Shipping, −40° C., 0% release, on the gas phase side | Storage, Shipping, −40° C., 0% release, on the gas phase side | Storage, Shipping, −40° C., 0% release, on the gas phase side |
| WCFF | HFO-1132 (E) | Mass % | 31.4 | 29.2 | 27.1 |
| | HFO-1123 | Mass % | 45.7 | 51.1 | 56.4 |
| | R1234yf | Mass % | 23.0 | 19.7 | 16.5 |
| Burning Velocity (WCF) | | cm/s | 8 or less | 8 or less | 8 or less |
| Burning Velocity (WCFF) | | cm/s | 10 | 10 | 10 |

The results indicate that under the condition that the mass % of HFO-1132(E), R32, and R1234yf based on their sum is respectively represented by x, y, and z, when coordinates (x,y,z) in the ternary composition diagram shown in FIG. 2 in which the sum of HFO-1132(E), R32, and R1234yf is 100 mass % are on the line segment that connects point I, point J, point K, and point L, or below these line segments, the refrigerant has a WCF lower flammability.

Figure 2:
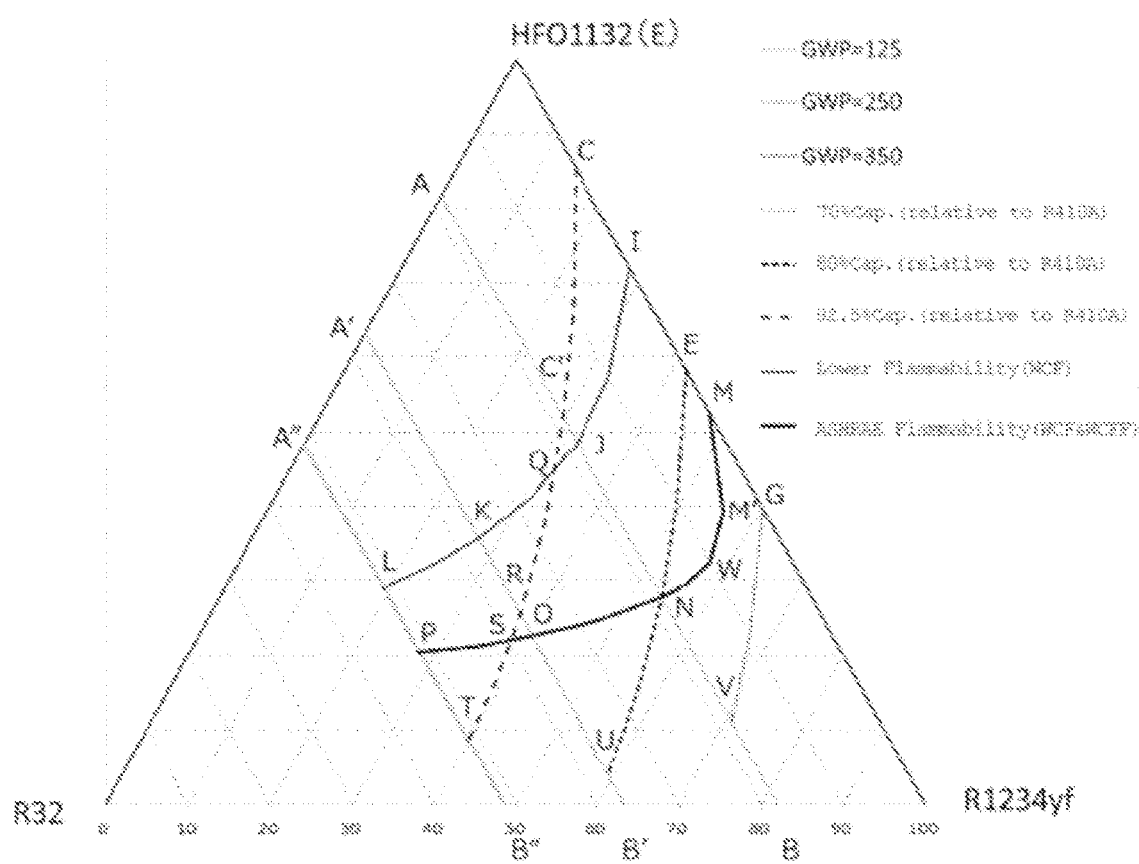
FIG. 2 is a view showing points A to C, E, G, and I to W; and line segments that connect points A to C, E, G, and I to W in a ternary composition diagram in which the sum of HFO-1132(E), R32, and R1234yf is 100 mass %.

The results also indicate that when coordinates (x,y,z) in the ternary composition diagram shown in FIG. 2 are on the line segments that connect point M, point M', point W, point J, point N, and point P, or below these line segments, the refrigerant has an ASHRAE lower flammability.

Mixed refrigerants were prepared by mixing HFO-1132 (E), R32, and R1234yf in amounts (mass %) shown in Tables 116 to 144 based on the sum of HFO-1132(E), R32, and R1234yf. The coefficient of performance (COP) ratio and the refrigerating capacity ratio relative to R410 of the mixed refrigerants shown in Tables 116 to 144 were determined. The conditions for calculation were as described below.

Evaporating temperature: 5° C.

Condensation temperature: 45° C.

Degree of superheating: 5 K

Degree of subcooling: 5 K

Compressor efficiency: 70%

Tables 116 to 144 show these values together with the GWP of each mixed refrigerant.

TABLE 116

| Item | Unit | Comparative Example 1 | Comparative Example 2 A | Comparative Example 3 B | Comparative Example 4 A' | Comparative Example 5 B' | Comparative Example 6 A'' | Comparative Example 7 B'' |
|---|---|---|---|---|---|---|---|---|
| HFO-1132(E) | Mass % | R410A | 81.6 | 0.0 | 63.1 | 0.0 | 48.2 | 0.0 |
| R32 | Mass % | | 18.4 | 18.1 | 36.9 | 36.7 | 51.8 | 51.5 |
| R1234yf | Mass % | | 0.0 | 81.9 | 0.0 | 63.3 | 0.0 | 48.5 |
| GWP | | 2088 | 125 | 125 | 250 | 250 | 350 | 350 |
| COP Ratio | % (relative to R410A) | 100 | 98.7 | 103.6 | 98.7 | 102.3 | 99.2 | 102.2 |
| Refrigerating Capacity Ratio | % (relative to R410A) | 100 | 105.3 | 62.5 | 109.9 | 77.5 | 112.1 | 87.3 |

TABLE 117

| Item | Unit | Comparative Example 8 C | Comparative Example 9 | Comparative Example 10 C' | Example 1 | Example 2 R | Example 3 | Example 4 T |
|---|---|---|---|---|---|---|---|---|
| HFO-1132(E) | Mass % | 85.5 | 66.1 | 52.1 | 37.8 | 25.5 | 16.6 | 8.6 |
| R32 | Mass % | 0.0 | 10.0 | 18.2 | 27.6 | 36.8 | 44.2 | 51.6 |
| R1234yf | Mass % | 14.5 | 23.9 | 29.7 | 34.6 | 37.7 | 39.2 | 39.8 |
| GWP | | 1 | 69 | 125 | 188 | 250 | 300 | 350 |
| COP Ratio | % (relative to R410A) | 99.8 | 99.3 | 99.3 | 99.6 | 100.2 | 100.8 | 101.4 |
| Refrigerating Capacity Ratio | % (relative to R410A) | 92.5 | 92.5 | 92.5 | 92.5 | 92.5 | 92.5 | 92.5 |

TABLE 118

| Item | Unit | Comparative Example 11 E | Example 5 | Example 6 N | Example 7 | Example 8 U | Comparative Example 12 G | Example 9 | Example 10 V |
|---|---|---|---|---|---|---|---|---|---|
| HFO-1132(E) | Mass % | 58.3 | 40.5 | 27.7 | 14.9 | 3.9 | 39.6 | 22.8 | 11.0 |
| R32 | Mass % | 0.0 | 10.0 | 18.2 | 27.6 | 36.7 | 0.0 | 10.0 | 18.1 |
| R1234yf | Mass % | 41.7 | 49.5 | 54.1 | 57.5 | 59.4 | 60.4 | 67.2 | 70.9 |
| GWP | | 2 | 70 | 125 | 189 | 250 | 3 | 70 | 125 |
| COP Ratio | % (relative to R410A) | 100.3 | 100.3 | 100.7 | 101.2 | 101.9 | 101.4 | 101.8 | 102.3 |
| Refrigerating Capacity Ratio | % (relative to R410A) | 80.0 | 80.0 | 80.0 | 80.0 | 80.0 | 70.0 | 70.0 | 70.0 |

TABLE 119

| Item | Unit | Comparative Example 13 | Example 11 | Example 12 J | Example 13 | Example 14 K | Example 15 | Example 16 L | Example 17 Q |
|---|---|---|---|---|---|---|---|---|---|
| HFO-1132(E) | Mass % | 72.0 | 57.2 | 48.5 | 41.2 | 35.6 | 32.0 | 28.9 | 44.6 |
| R32 | Mass % | 0.0 | 10.0 | 18.3 | 27.6 | 36.8 | 44.2 | 51.7 | 23.0 |
| R1234yf | Mass % | 28.0 | 32.8 | 33.2 | 31.2 | 27.6 | 23.8 | 19.4 | 32.4 |
| GWP | | 2 | 69 | 125 | 188 | 250 | 300 | 350 | 157 |
| COP Ratio | % (relative to R410A) | 99.9 | 99.5 | 99.4 | 99.5 | 99.6 | 99.8 | 100.1 | 99.4 |
| Refrigerating Capacity Ratio | % (relative to R410A) | 86.6 | 88.4 | 90.9 | 94.2 | 97.7 | 100.5 | 103.3 | 92.5 |

TABLE 120

| Item | Unit | Comparative Example 14 M | Example 18 | Example 19 W | Example 20 | Example 21 N | Example 22 |
|---|---|---|---|---|---|---|---|
| HFO-1132(E) | Mass % | 52.6 | 39.2 | 32.4 | 29.3 | 27.7 | 24.5 |
| R32 | Mass % | 0.0 | 5.0 | 10.0 | 14.5 | 18.2 | 27.6 |
| R1234yf | Mass % | 47.4 | 55.8 | 57.6 | 56.2 | 54.1 | 47.9 |
| GWP |  | 2 | 36 | 70 | 100 | 125 | 188 |
| COP Ratio | % (relative to R410A) | 100.5 | 100.9 | 100.9 | 100.8 | 100.7 | 100.4 |
| Refrigerating Capacity Ratio | % (relative to R410A) | 77.1 | 74.8 | 75.6 | 77.8 | 80.0 | 85.5 |

TABLE 121

| Item | Unit | Example 23 O | Example 24 | Example 25 P | Example 26 S |
|---|---|---|---|---|---|
| HFO-1132(E) | Mass % | 22.6 | 21.2 | 20.5 | 21.9 |
| R32 | Mass % | 36.8 | 44.2 | 51.7 | 39.7 |
| R1234yf | Mass % | 40.6 | 34.6 | 27.8 | 38.4 |
| GWP |  | 250 | 300 | 350 | 270 |
| COP Ratio | %(relative to R410A) | 100.4 | 100.5 | 100.6 | 100.4 |
| Refrigerating Capacity Ratio | %(relative to R410A) | 91.0 | 95.0 | 99.1 | 92.5 |

TABLE 122

| Item | Unit | Comparative Example 15 | Comparative Example 16 | Comparative Example 17 | Comparative Example 18 | Example 27 | Example 28 | Comparative Example 19 | Comparative Example 20 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 5.0 | 5.0 | 5.0 | 5.0 | 5.0 | 5.0 | 5.0 | 5.0 |
| R1234yf | Mass % | 85.0 | 75.0 | 65.0 | 55.0 | 45.0 | 35.0 | 25.0 | 15.0 |
| GWP |  | 37 | 37 | 37 | 36 | 36 | 36 | 35 | 35 |
| COP Ratio | % (relative to R410A) | 103.4 | 102.6 | 101.6 | 100.8 | 100.2 | 99.8 | 99.6 | 99.4 |
| Refrigerating Capacity Ratio | % (relative to R410A) | 56.4 | 63.3 | 69.5 | 75.2 | 80.5 | 85.4 | 90.1 | 94.4 |

TABLE 123

| Item | Unit | Comparative Example 21 | Comparative Example 22 | Example 29 | Comparative Example 23 | Example 30 | Comparative Example 24 | Comparative Example 25 | Comparative Example 26 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 10.0 | 10.0 | 10.0 | 10.0 | 10.0 | 10.0 | 10.0 | 10.0 |
| R1234yf | Mass % | 80.0 | 70.0 | 60.0 | 50.0 | 40.0 | 30.0 | 20.0 | 10.0 |
| GWP |  | 71 | 71 | 70 | 70 | 70 | 69 | 69 | 69 |
| COP Ratio | % (relative to R410A) | 103.1 | 102.1 | 101.1 | 100.4 | 99.8 | 99.5 | 99.2 | 99.1 |
| Refrigerating Capacity Ratio | % (relative to R410A) | 61.8 | 68.3 | 74.3 | 79.7 | 84.9 | 89.7 | 94.2 | 98.4 |

TABLE 124

| Item | Unit | Comparative Example 27 | Example 31 | Comparative Example 28 | Example 32 | Example 33 | Comparative Example 29 | Comparative Example 30 | Comparative Example 31 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 15.0 | 15.0 | 15.0 | 15.0 | 15.0 | 15.0 | 15.0 | 15.0 |
| R1234yf | Mass % | 75.0 | 65.0 | 55.0 | 45.0 | 35.0 | 25.0 | 15.0 | 5.0 |

TABLE 124-continued

| Item | Unit | Comparative Example 27 | Example 31 | Comparative Example 28 | Example 32 | Example 33 | Comparative Example 29 | Comparative Example 30 | Comparative Example 31 |
|---|---|---|---|---|---|---|---|---|---|
| GWP | | 104 | 104 | 104 | 103 | 103 | 103 | 103 | 102 |
| COP Ratio | % (relative to R410A) | 102.7 | 101.6 | 100.7 | 100.0 | 99.5 | 99.2 | 99.0 | 98.9 |
| Refrigerating Capacity Ratio | % (relative to R410A) | 66.6 | 72.9 | 78.6 | 84.0 | 89.0 | 93.7 | 98.1 | 102.2 |

TABLE 125

| Item | Unit | Comparative Example 32 | Comparative Example 33 | Comparative Example 34 | Comparative Example 35 | Comparative Example 36 | Comparative Example 37 | Comparative Example 38 | Comparative Example 39 |
|---|---|---|---|---|---|---|---|---|---|
| HFO-1132(E) | Mass % | 10.0 | 20.0 | 30.0 | 40.0 | 50.0 | 60.0 | 70.0 | 10.0 |
| R32 | Mass % | 20.0 | 20.0 | 20.0 | 20.0 | 20.0 | 20.0 | 20.0 | 25.0 |
| R1234yf | Mass % | 70.0 | 60.0 | 50.0 | 40.0 | 30.0 | 20.0 | 10.0 | 65.0 |
| GWP | | 138 | 138 | 137 | 137 | 137 | 136 | 136 | 171 |
| COP Ratio | % (relative to R410A) | 102.3 | 101.2 | 100.4 | 99.7 | 99.3 | 99.0 | 98.8 | 101.9 |
| Refrigerating Capacity Ratio | % (relative to R410A) | 71.0 | 77.1 | 82.7 | 88.0 | 92.9 | 97.5 | 101.7 | 75.0 |

TABLE 126

| Item | Unit | Example 34 | Comparative Example 40 | Comparative Example 41 | Comparative Example 42 | Comparative Example 43 | Comparative Example 44 | Comparative Example 45 | Example 35 |
|---|---|---|---|---|---|---|---|---|---|
| HFO-1132(E) | Mass % | 20.0 | 30.0 | 40.0 | 50.0 | 60.0 | 70.0 | 10.0 | 20.0 |
| R32 | Mass % | 25.0 | 25.0 | 25.0 | 25.0 | 25.0 | 25.0 | 30.0 | 30.0 |
| R1234yf | Mass % | 55.0 | 45.0 | 35.0 | 25.0 | 15.0 | 5.0 | 60.0 | 50.0 |
| GWP | | 171 | 171 | 171 | 170 | 170 | 170 | 205 | 205 |
| COP Ratio | % (relative to R410A) | 100.9 | 100.1 | 99.6 | 99.2 | 98.9 | 98.7 | 101.6 | 100.7 |
| Refrigerating Capacity Ratio | % (relative to R410A) | 81.0 | 86.6 | 91.7 | 96.5 | 101.0 | 105.2 | 78.9 | 84.8 |

TABLE 127

| Item | Unit | Comparative Example 46 | Comparative Example 47 | Comparative Example 48 | Comparative Example 49 | Example 36 | Example 37 | Example 38 | Comparative Example 50 |
|---|---|---|---|---|---|---|---|---|---|
| HFO-1132(E) | Mass % | 30.0 | 40.0 | 50.0 | 60.0 | 10.0 | 20.0 | 30.0 | 40.0 |
| R32 | Mass % | 30.0 | 30.0 | 30.0 | 30.0 | 35.0 | 35.0 | 35.0 | 35.0 |
| R1234yf | Mass % | 40.0 | 30.0 | 20.0 | 10.0 | 55.0 | 45.0 | 35.0 | 25.0 |
| GWP | | 204 | 204 | 204 | 204 | 239 | 238 | 238 | 238 |
| COP Ratio | % (relative to R410A) | 100.0 | 99.5 | 99.1 | 98.8 | 101.4 | 100.6 | 99.9 | 99.4 |
| Refrigerating Capacity Ratio | % (relative to R410A) | 90.2 | 95.3 | 100.0 | 104.4 | 82.5 | 88.3 | 93.7 | 98.6 |

TABLE 128

| Item | Unit | Comparative Example 51 | Comparative Example 52 | Comparative Example 53 | Comparative Example 54 | Example 39 | Comparative Example 55 | Comparative Example 56 | Comparative Example 57 |
|---|---|---|---|---|---|---|---|---|---|
| HFO-1132(E) | Mass % | 50.0 | 60.0 | 10.0 | 20.0 | 30.0 | 40.0 | 50.0 | 10.0 |
| R32 | Mass % | 35.0 | 35.0 | 40.0 | 40.0 | 40.0 | 40.0 | 40.0 | 45.0 |
| R1234yf | Mass % | 15.0 | 5.0 | 50.0 | 40.0 | 30.0 | 20.0 | 10.0 | 45.0 |
| GWP | | 237 | 237 | 272 | 272 | 272 | 271 | 271 | 306 |

TABLE 128-continued

| Item | Unit | Comparative Example 51 | Comparative Example 52 | Comparative Example 53 | Comparative Example 54 | Example 39 | Comparative Example 55 | Comparative Example 56 | Comparative Example 57 |
|---|---|---|---|---|---|---|---|---|---|
| COP Ratio | % (relative to R410A) | 99.0 | 98.8 | 101.3 | 100.6 | 99.9 | 99.4 | 99.0 | 101.3 |
| Refrigerating Capacity Ratio | % (relative to R410A) | 103.2 | 107.5 | 86.0 | 91.7 | 96.9 | 101.8 | 106.3 | 89.3 |

TABLE 129

| Item | Unit | Example 40 | Example 41 | Comparative Example 58 | Comparative Example 59 | Comparative Example 60 | Example 42 | Comparative Example 61 | Comparative Example 62 |
|---|---|---|---|---|---|---|---|---|---|
| HFO-1132(E) | Mass % | 20.0 | 30.0 | 40.0 | 50.0 | 10.0 | 20.0 | 30.0 | 40.0 |
| R32 | Mass % | 45.0 | 45.0 | 45.0 | 45.0 | 50.0 | 50.0 | 50.0 | 50.0 |
| R1234yf | Mass % | 35.0 | 25.0 | 15.0 | 5.0 | 40.0 | 30.0 | 20.0 | 10.0 |
| GWP | — | 305 | 305 | 305 | 304 | 339 | 339 | 339 | 338 |
| COP Ratio | % (relative to R410A) | 100.6 | 100.0 | 99.5 | 99.1 | 101.3 | 100.6 | 100.0 | 99.5 |
| Refrigerating Capacity Ratio | % (relative to R410A) | 94.9 | 100.0 | 104.7 | 109.2 | 92.4 | 97.8 | 102.9 | 107.5 |

TABLE 130

| Item | Unit | Comparative Example 63 | Comparative Example 64 | Comparative Example 65 | Comparative Example 66 | Example 43 | Example 44 | Example 45 | Example 46 |
|---|---|---|---|---|---|---|---|---|---|
| HFO-1132(E) | Mass % | 10.0 | 20.0 | 30.0 | 40.0 | 56.0 | 59.0 | 62.0 | 65.0 |
| R32 | Mass % | 55.0 | 55.0 | 55.0 | 55.0 | 3.0 | 3.0 | 3.0 | 3.0 |
| R1234yf | Mass % | 35.0 | 25.0 | 15.0 | 5.0 | 41.0 | 38.0 | 35.0 | 32.0 |
| GWP | — | 373 | 372 | 372 | 372 | 22 | 22 | 22 | 22 |
| COP Ratio | % (relative to R410A) | 101.4 | 100.7 | 100.1 | 99.6 | 100.1 | 100.0 | 99.9 | 99.8 |
| Refrigerating Capacity Ratio | % (relative to R410A) | 95.3 | 100.6 | 105.6 | 110.2 | 81.7 | 83.2 | 84.6 | 86.0 |

TABLE 131

| Item | Unit | Example 47 | Example 48 | Example 49 | Example 50 | Example 51 | Example 52 | Example 53 | Example 54 |
|---|---|---|---|---|---|---|---|---|---|
| HFO-1132(E) | Mass % | 49.0 | 52.0 | 55.0 | 58.0 | 61.0 | 43.0 | 46.0 | 49.0 |
| R32 | Mass % | 6.0 | 6.0 | 6.0 | 6.0 | 6.0 | 9.0 | 9.0 | 9.0 |
| R1234yf | Mass % | 45.0 | 42.0 | 39.0 | 36.0 | 33.0 | 48.0 | 45.0 | 42.0 |
| GWP | — | 43 | 43 | 43 | 43 | 42 | 63 | 63 | 63 |
| COP Ratio | % (relative to R410A) | 100.2 | 100.0 | 99.9 | 99.8 | 99.7 | 100.3 | 100.1 | 99.9 |
| Refrigerating Capacity Ratio | % (relative to R410A) | 80.9 | 82.4 | 83.9 | 85.4 | 86.8 | 80.4 | 82.0 | 83.5 |

TABLE 132

| Item | Unit | Example 55 | Example 56 | Example 57 | Example 58 | Example 59 | Example 60 | Example 61 | Example 62 |
|---|---|---|---|---|---|---|---|---|---|
| HFO-1132(E) | Mass % | 52.0 | 55.0 | 58.0 | 38.0 | 41.0 | 44.0 | 47.0 | 50.0 |
| R32 | Mass % | 9.0 | 9.0 | 9.0 | 12.0 | 12.0 | 12.0 | 12.0 | 12.0 |
| R1234yf | Mass % | 39.0 | 36.0 | 33.0 | 50.0 | 47.0 | 44.0 | 41.0 | 38.0 |
| GWP | — | 63 | 63 | 63 | 83 | 83 | 83 | 83 | 83 |
| COP Ratio | % (relative to R410A) | 99.8 | 99.7 | 99.6 | 100.3 | 100.1 | 100.0 | 99.8 | 99.7 |

TABLE 132-continued

| Item | Unit | Example 55 | Example 56 | Example 57 | Example 58 | Example 59 | Example 60 | Example 61 | Example 62 |
|---|---|---|---|---|---|---|---|---|---|
| Refrigerating Capacity Ratio | % (relative to R410A) | 85.0 | 86.5 | 87.9 | 80.4 | 82.0 | 83.5 | 85.1 | 86.6 |

TABLE 133

| Item | Unit | Example 63 | Example 64 | Example 65 | Example 66 | Example 67 | Example 68 | Example 69 | Example 70 |
|---|---|---|---|---|---|---|---|---|---|
| HFO-1132(E) | Mass % | 53.0 | 33.0 | 36.0 | 39.0 | 42.0 | 45.0 | 48.0 | 51.0 |
| R32 | Mass % | 12.0 | 15.0 | 15.0 | 15.0 | 15.0 | 15.0 | 15.0 | 15.0 |
| R1234yf | Mass % | 35.0 | 52.0 | 49.0 | 46.0 | 43.0 | 40.0 | 37.0 | 34.0 |
| GWP | — | 83 | 104 | 104 | 103 | 103 | 103 | 103 | 103 |
| COP Ratio | % (relative to R410A) | 99.6 | 100.5 | 100.3 | 100.1 | 99.9 | 99.7 | 99.6 | 99.5 |
| Refrigerating Capacity Ratio | % (relative to R410A) | 88.0 | 80.3 | 81.9 | 83.5 | 85.0 | 86.5 | 88.0 | 89.5 |

TABLE 134

| Item | Unit | Example 71 | Example 72 | Example 73 | Example 74 | Example 75 | Example 76 | Example 77 | Example 78 |
|---|---|---|---|---|---|---|---|---|---|
| HFO-1132(E) | Mass % | 29.0 | 32.0 | 35.0 | 38.0 | 41.0 | 44.0 | 47.0 | 36.0 |
| R32 | Mass % | 18.0 | 18.0 | 18.0 | 18.0 | 18.0 | 18.0 | 18.0 | 3.0 |
| R1234yf | Mass % | 53.0 | 50.0 | 47.0 | 44.0 | 41.0 | 38.0 | 35.0 | 61.0 |
| GWP | — | 124 | 124 | 124 | 124 | 124 | 123 | 123 | 23 |
| COP Ratio | % (relative to R410A) | 100.6 | 100.3 | 100.1 | 99.9 | 99.8 | 99.6 | 99.5 | 101.3 |
| Refrigerating Capacity Ratio | % (relative to R410A) | 80.6 | 82.2 | 83.8 | 85.4 | 86.9 | 88.4 | 89.9 | 71.0 |

TABLE 135

| Item | Unit | Example 79 | Example 80 | Example 81 | Example 82 | Example 83 | Example 84 | Example 85 | Example 86 |
|---|---|---|---|---|---|---|---|---|---|
| HFO-1132(E) | Mass % | 39.0 | 42.0 | 30.0 | 33.0 | 36.0 | 26.0 | 29.0 | 32.0 |
| R32 | Mass % | 3.0 | 3.0 | 6.0 | 6.0 | 6.0 | 9.0 | 9.0 | 9.0 |
| R1234yf | Mass % | 58.0 | 55.0 | 64.0 | 61.0 | 58.0 | 65.0 | 62.0 | 59.0 |
| GWP | — | 23 | 23 | 43 | 43 | 43 | 64 | 64 | 63 |
| COP Ratio | % (relative to R410A) | 101.1 | 100.9 | 101.5 | 101.3 | 101.0 | 101.6 | 101.3 | 101.1 |
| Refrigerating Capacity Ratio | % (relative to R410A) | 72.7 | 74.4 | 70.5 | 72.2 | 73.9 | 71.0 | 72.8 | 74.5 |

TABLE 136

| Item | Unit | Example 87 | Example 88 | Example 89 | Example 90 | Example 91 | Example 92 | Example 93 | Example 94 |
|---|---|---|---|---|---|---|---|---|---|
| HFO-1132(E) | Mass % | 21.0 | 24.0 | 27.0 | 30.0 | 16.0 | 19.0 | 22.0 | 25.0 |
| R32 | Mass % | 12.0 | 12.0 | 12.0 | 12.0 | 15.0 | 15.0 | 15.0 | 15.0 |
| R1234yf | Mass % | 67.0 | 64.0 | 61.0 | 58.0 | 69.0 | 66.0 | 63.0 | 60.0 |
| GWP | — | 84 | 84 | 84 | 84 | 104 | 104 | 104 | 104 |
| COP Ratio | % (relative to R410A) | 101.8 | 101.5 | 101.2 | 101.0 | 102.1 | 101.8 | 101.4 | 101.2 |
| Refrigerating Capacity Ratio | % (relative to R410A) | 70.8 | 72.6 | 74.3 | 76.0 | 70.4 | 72.3 | 74.0 | 75.8 |

TABLE 137

| Item | Unit | Example 95 | Example 96 | Example 97 | Example 98 | Example 99 | Example 100 | Example 101 | Example 102 |
|---|---|---|---|---|---|---|---|---|---|
| HFO-1132(E) | Mass % | 28.0 | 12.0 | 15.0 | 18.0 | 21.0 | 24.0 | 27.0 | 25.0 |
| R32 | Mass % | 15.0 | 18.0 | 18.0 | 18.0 | 18.0 | 18.0 | 18.0 | 21.0 |
| R1234yf | Mass % | 57.0 | 70.0 | 67.0 | 64.0 | 61.0 | 58.0 | 55.0 | 54.0 |
| GWP | — | 104 | 124 | 124 | 124 | 124 | 124 | 124 | 144 |
| COP Ratio | % (relative to R410A) | 100.9 | 102.2 | 101.9 | 101.6 | 101.3 | 101.0 | 100.7 | 100.7 |
| Refrigerating Capacity Ratio | % (relative to R410A) | 77.5 | 70.5 | 72.4 | 74.2 | 76.0 | 77.7 | 79.4 | 80.7 |

TABLE 138

| Item | Unit | Example 103 | Example 104 | Example 105 | Example 106 | Example 107 | Example 108 | Example 109 | Example 110 |
|---|---|---|---|---|---|---|---|---|---|
| HFO-1132(E) | Mass % | 21.0 | 24.0 | 17.0 | 20.0 | 23.0 | 13.0 | 16.0 | 19.0 |
| R32 | Mass % | 24.0 | 24.0 | 27.0 | 27.0 | 27.0 | 30.0 | 30.0 | 30.0 |
| R1234yf | Mass % | 55.0 | 52.0 | 56.0 | 53.0 | 50.0 | 57.0 | 54.0 | 51.0 |
| GWP | — | 164 | 164 | 185 | 185 | 184 | 205 | 205 | 205 |
| COP Ratio | % (relative to R410A) | 100.9 | 100.6 | 101.1 | 100.8 | 100.6 | 101.3 | 101.0 | 100.8 |
| Refrigerating Capacity Ratio | % (relative to R410A) | 80.8 | 82.5 | 80.8 | 82.5 | 84.2 | 80.7 | 82.5 | 84.2 |

TABLE 139

| Item | Unit | Example 111 | Example 112 | Example 113 | Example 114 | Example 115 | Example 116 | Example 117 | Example 118 |
|---|---|---|---|---|---|---|---|---|---|
| HFO-1132(E) | Mass % | 22.0 | 9.0 | 12.0 | 15.0 | 18.0 | 21.0 | 8.0 | 12.0 |
| R32 | Mass % | 30.0 | 33.0 | 33.0 | 33.0 | 33.0 | 33.0 | 36.0 | 36.0 |
| R1234yf | Mass % | 48.0 | 58.0 | 55.0 | 52.0 | 49.0 | 46.0 | 56.0 | 52.0 |
| GWP | — | 205 | 225 | 225 | 225 | 225 | 225 | 245 | 245 |
| COP Ratio | % (relative to R410A) | 100.5 | 101.6 | 101.3 | 101.0 | 100.8 | 100.5 | 101.6 | 101.2 |
| Refrigerating Capacity Ratio | % (relative to R410A) | 85.9 | 80.5 | 82.3 | 84.1 | 85.8 | 87.5 | 82.0 | 84.4 |

TABLE 140

| Item | Unit | Example 119 | Example 120 | Example 121 | Example 122 | Example 123 | Example 124 | Example 125 | Example 126 |
|---|---|---|---|---|---|---|---|---|---|
| HFO-1132(E) | Mass % | 15.0 | 18.0 | 21.0 | 42.0 | 39.0 | 34.0 | 37.0 | 30.0 |
| R32 | Mass % | 36.0 | 36.0 | 36.0 | 25.0 | 28.0 | 31.0 | 31.0 | 34.0 |
| R1234yf | Mass % | 49.0 | 46.0 | 43.0 | 33.0 | 33.0 | 35.0 | 32.0 | 36.0 |
| GWP | — | 245 | 245 | 245 | 170 | 191 | 211 | 211 | 231 |
| COP Ratio | % (relative to R410A) | 101.0 | 100.7 | 100.5 | 99.5 | 99.5 | 99.8 | 99.6 | 99.9 |
| Refrigerating Capacity Ratio | % (relative to R410A) | 86.2 | 87.9 | 89.6 | 92.7 | 93.4 | 93.0 | 94.5 | 93.0 |

TABLE 141

| Item | Unit | Example 127 | Example 128 | Example 129 | Example 130 | Example 131 | Example 132 | Example 133 | Example 134 |
|---|---|---|---|---|---|---|---|---|---|
| HFO-1132(E) | Mass % | 33.0 | 36.0 | 24.0 | 27.0 | 30.0 | 33.0 | 23.0 | 26.0 |
| R32 | Mass % | 34.0 | 34.0 | 37.0 | 37.0 | 37.0 | 37.0 | 40.0 | 40.0 |

TABLE 141-continued

| Item | Unit | Example 127 | Example 128 | Example 129 | Example 130 | Example 131 | Example 132 | Example 133 | Example 134 |
|---|---|---|---|---|---|---|---|---|---|
| R1234yf | Mass % | 33.0 | 30.0 | 39.0 | 36.0 | 33.0 | 30.0 | 37.0 | 34.0 |
| GWP | — | 231 | 231 | 252 | 251 | 251 | 251 | 272 | 272 |
| COP Ratio | % (relative to R410A) | 99.8 | 99.6 | 100.3 | 100.1 | 99.9 | 99.8 | 100.4 | 100.2 |
| Refrigerating Capacity Ratio | % (relative to R410A) | 94.5 | 96.0 | 91.9 | 93.4 | 95.0 | 96.5 | 93.3 | 94.9 |

TABLE 142

| Item | Unit | Example 135 | Example 136 | Example 137 | Example 138 | Example 139 | Example 140 | Example 141 | Example 142 |
|---|---|---|---|---|---|---|---|---|---|
| HFO-1132(E) | Mass % | 29.0 | 32.0 | 19.0 | 22.0 | 25.0 | 28.0 | 31.0 | 18.0 |
| R32 | Mass % | 40.0 | 40.0 | 43.0 | 43.0 | 43.0 | 43.0 | 43.0 | 46.0 |
| R1234yf | Mass % | 31.0 | 28.0 | 38.0 | 35.0 | 32.0 | 29.0 | 26.0 | 36.0 |
| GWP | — | 272 | 271 | 292 | 292 | 292 | 292 | 292 | 312 |
| COP Ratio | % (relative to R410A) | 100.0 | 99.8 | 100.6 | 100.4 | 100.2 | 100.1 | 99.9 | 100.7 |
| Refrigerating Capacity Ratio | % (relative to R410A) | 96.4 | 97.9 | 93.1 | 94.7 | 96.2 | 97.8 | 99.3 | 94.4 |

TABLE 143

| Item | Unit | Example 143 | Example 144 | Example 145 | Example 146 | Example 147 | Example 148 | Example 149 | Example 150 |
|---|---|---|---|---|---|---|---|---|---|
| HFO-1132(E) | Mass % | 21.0 | 23.0 | 26.0 | 29.0 | 13.0 | 16.0 | 19.0 | 22.0 |
| R32 | Mass % | 46.0 | 46.0 | 46.0 | 46.0 | 49.0 | 49.0 | 49.0 | 49.0 |
| R1234yf | Mass % | 33.0 | 31.0 | 28.0 | 25.0 | 38.0 | 35.0 | 32.0 | 29.0 |
| GWP | — | 312 | 312 | 312 | 312 | 332 | 332 | 332 | 332 |
| COP Ratio | % (relative to R410A) | 100.5 | 100.4 | 100.2 | 100.0 | 101.1 | 100.9 | 100.7 | 100.5 |
| Refrigerating Capacity Ratio | % (relative to R410A) | 96.0 | 97.0 | 98.6 | 100.1 | 93.5 | 95.1 | 96.7 | 98.3 |

TABLE 144

| Item | Unit | Example 151 | Example 152 |
|---|---|---|---|
| HFO-1132(E) | Mass % | 25.0 | 28.0 |
| R32 | Mass % | 49.0 | 49.0 |
| R1234yf | Mass % | 26.0 | 23.0 |
| GWP | — | 332 | 332 |
| COP Ratio | %(relative to R410A) | 100.3 | 100.1 |
| Refrigerating Capacity Ratio | %(relative to R410A) | 99.8 | 101.3 |

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI),
the line segment IJ is represented by coordinates $(0.0236y^2-1.7616y+72.0,\ y,\ -0.0236y^2+0.7616y+28.0)$,
the line segment NE is represented by coordinates $(0.012y^2-1.9003y+58.3,\ y,\ -0.012y^2+0.9003y+41.7)$, and
the line segments JN and EI are straight lines, the refrigerant D has a refrigerating capacity ratio of 80% or more relative to R410A, a GWP of 125 or less, and a WCF lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM),
the line segment MM' is represented by coordinates $(0.132y^2-3.34y+52.6,\ y,\ -0.132y^2+2.34y+47.4)$,
the line segment M'N is represented by coordinates $(0.0596y^2-2.2541y+48.98,\ y,\ -0.0596y^2+1.2541y+51.02)$, the line segment VG is represented by coordinates $(0.0123y^2-1.8033y+39.6, y, -0.0123y^2+0.8033y+60.4)$, and the line segments NV and GM are straight lines, the refrigerant D according to the present disclosure has a refrigerating capacity ratio of 70% or more relative to R410A, a GWP of 125 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments ON, NU, and UO that connect the following 3 points:

point O (22.6, 36.8, 40.6),
point N (27.7, 18.2, 54.1), and
point U (3.9, 36.7, 59.4),
or on these line segments,
the line segment ON is represented by coordinates $(0.0072y^2-0.6701y+37.512, y, -0.0072y^2-0.3299y+62.488)$,
the line segment NU is represented by coordinates $(0.0083y^2-1.7403y+56.635, y, -0.0083y^2+0.7403y+43.365)$, and
the line segment UO is a straight line, the refrigerant D according to the present disclosure has a refrigerating capacity ratio of 80% or more relative to R410A, a GWP of 250 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:

point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments,
the line segment QR is represented by coordinates $(0.0099y^2-1.975y+84.765, y, -0.0099y^2+0.975y+15.235)$,
the line segment RT is represented by coordinates $(0.0082y^2-1.8683y+83.126, y, -0.0082y^2+0.8683y+16.874)$,
the line segment LK is represented by coordinates $(0.0049y^2-0.8842y+61.488, y, -0.0049y^2-0.1158y+38.512)$,
the line segment KQ is represented by coordinates $(0.0095y^2-1.2222y+67.676, y, -0.0095y^2+0.2222y+32.324)$, and
the line segment TL is a straight line, the refrigerant D according to the present disclosure has a refrigerating capacity ratio of 92.5% or more relative to R410A, a GWP of 350 or less, and a WCF lower flammability.

The results further indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments PS, ST, and TP that connect the following 3 points:

point P (20.5, 51.7, 27.8),
point S (21.9, 39.7, 38.4), and
point T (8.6, 51.6, 39.8),
or on these line segments,
the line segment PS is represented by coordinates $(0.0064y^2-0.7103y+40.1, y, -0.0064y^2-0.2897y+59.9)$,
the line segment ST is represented by coordinates $(0.0082y^2-1.8683y+83.126, y, -0.0082y^2+0.8683y+16.874)$, and
the line segment TP is a straight line, the refrigerant D according to the present disclosure has a refrigerating capacity ratio of 92.5% or more relative to R410A, a GWP of 350 or less, and an ASHRAE lower flammability.

(6) Specific Embodiment

Figure 3:
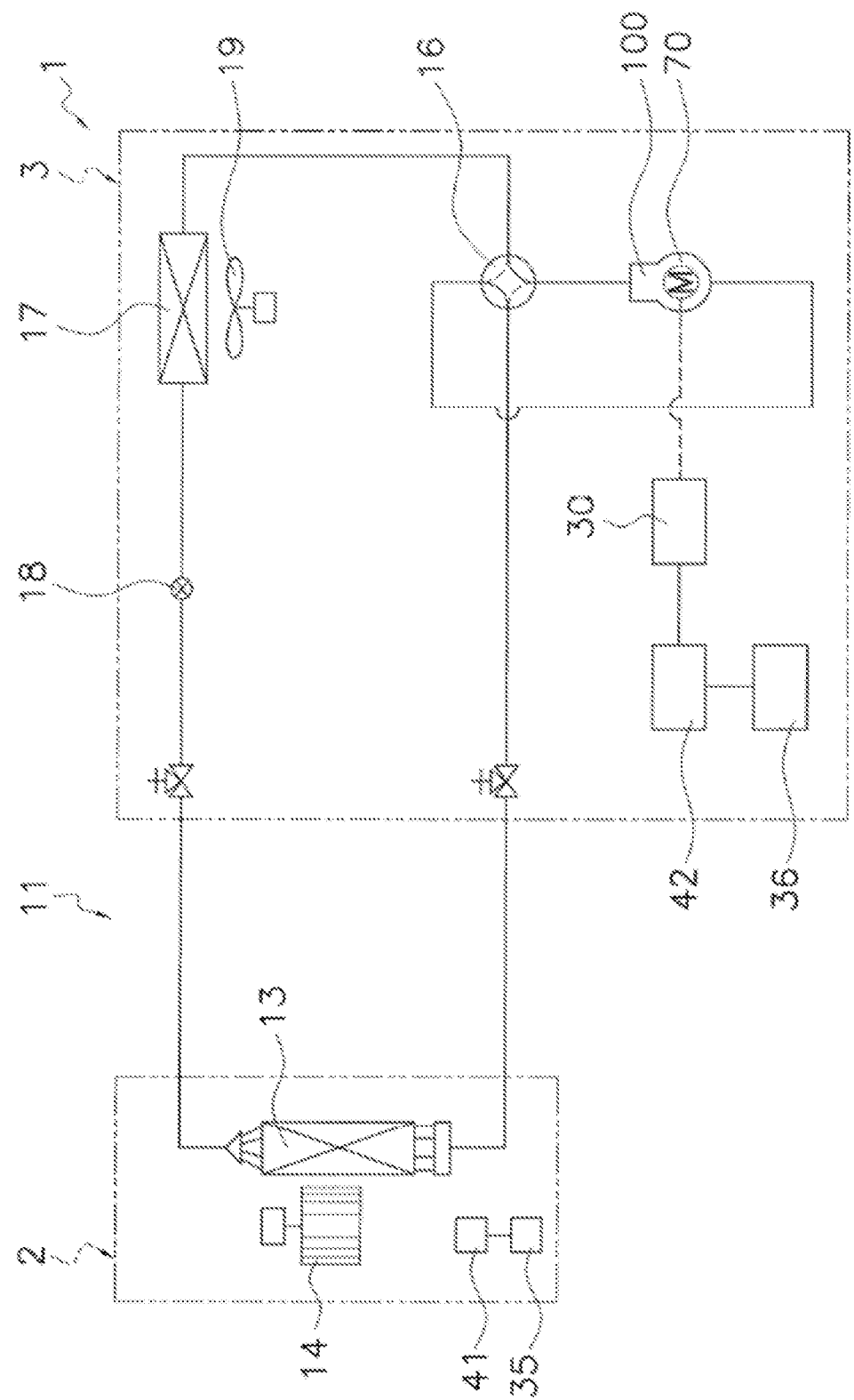
FIG. 3 is a configuration diagram of an air conditioner according to one embodiment of the present disclosure.

FIG. 3 is a configuration diagram of an air conditioner 1 according to a first embodiment of the present disclosure. In FIG. 3, the air conditioner 1 is constituted by a utilization unit 2 and a heat source unit 3.

(6-1) Configuration of Air Conditioner 1

The air conditioner 1 has a refrigerant circuit 11 in which a compressor 100, a four-way switching valve 16, a heat-source-side heat exchanger 17, an expansion valve 18 serving as a decompression mechanism, and a utilization-side heat exchanger 13 are connected in a loop shape by refrigerant pipes.

In this embodiment, the refrigerant circuit 11 is filled with refrigerant for performing a vapor compression refrigeration cycle. The refrigerant is a refrigerant mixture containing 1,2-difluoroethylene, and any one of the above-described refrigerant A to refrigerant E can be used. The refrigerant circuit 11 is filled with refrigerating machine oil together with the refrigerant mixture.

(6-1-1) Utilization Unit 2

In the refrigerant circuit 11, the utilization-side heat exchanger 13 belongs to the utilization unit 2. In addition, a utilization-side fan 14 is mounted in the utilization unit 2. The utilization-side fan 14 generates an air flow to the utilization-side heat exchanger 13.

A utilization-side communicator 35 and a utilization-side microcomputer 41 are mounted in the utilization unit 2. The utilization-side communicator 35 is connected to the utilization-side microcomputer 41.

The utilization-side communicator 35 is used by the utilization unit 2 to communicate with the heat source unit 3. The utilization-side microcomputer 41 is supplied with a control voltage even during a standby state in which the air conditioner 1 is not operating. Thus, the utilization-side microcomputer 41 is constantly activated.

(6-1-2) Heat Source Unit 3

In the refrigerant circuit 11, the compressor 100, the four-way switching valve 16, the heat-source-side heat exchanger 17, and the expansion valve 18 belong to the heat source unit 3. In addition, a heat-source-side fan 19 is mounted in the heat source unit 3. The heat-source-side fan 19 generates an air flow to the heat-source-side heat exchanger 17.

In addition, a connection unit 30, a heat-source-side communicator 36, and a heat-source-side microcomputer 42 are mounted in the heat source unit 3. The connection unit 30 and the heat-source-side communicator 36 are connected to the heat-source-side microcomputer 42.

(6-2) Configuration of Connection Unit 30

Figure 4:
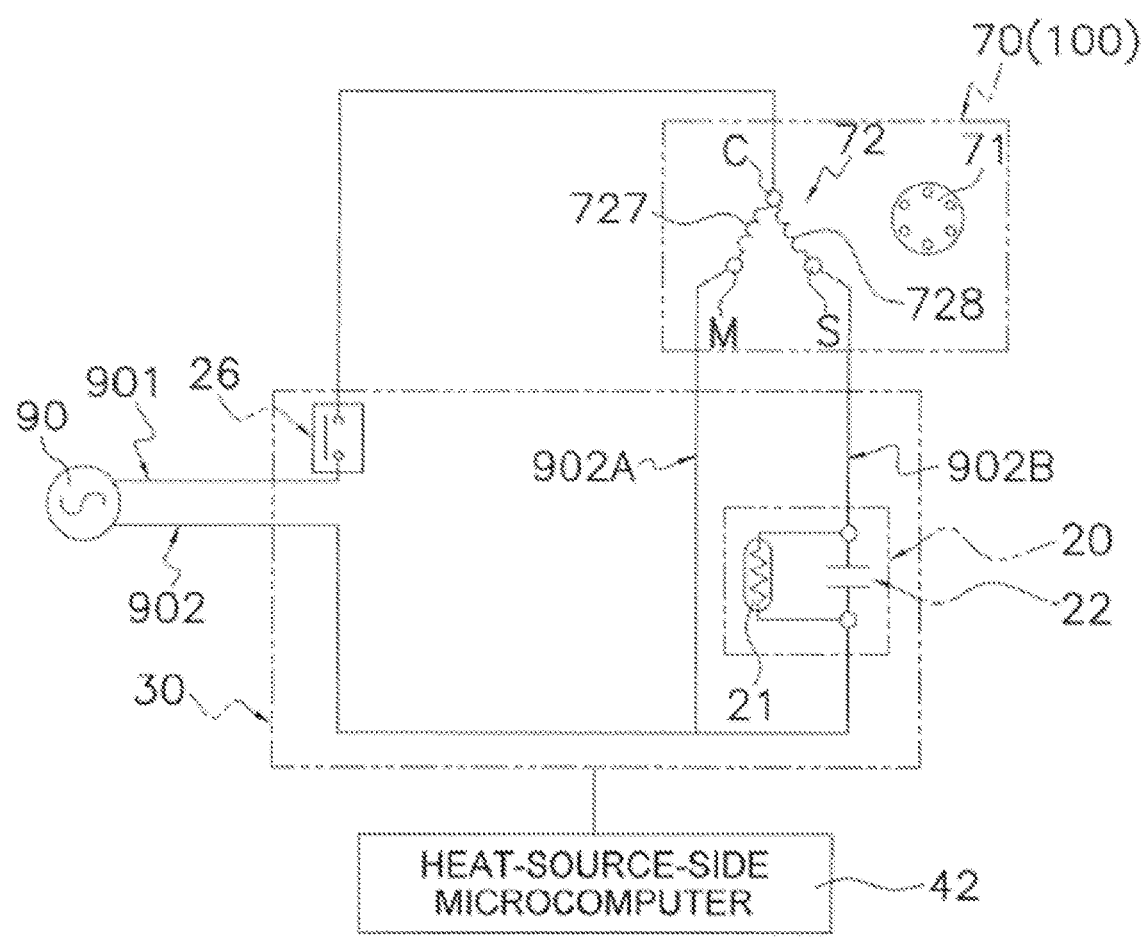
FIG. 4 is an operation circuit diagram of a motor of a compressor.

FIG. 4 is an operation circuit diagram of a motor 70 of the compressor 100. In FIG. 4, the connection unit 30 is a circuit that causes power to be supplied from an alternating-current (AC) power source 90 to the motor 70 of the compressor 100 without frequency conversion.

The motor 70 is an induction motor and includes a squirrel-cage rotor 71, and a stator 72 having a main winding 727 and an auxiliary winding 728. The squirrel-cage rotor 71 rotates following a rotating magnetic field generated by the stator 72.

The compressor 100 has an M terminal, an S terminal, and a C terminal. The M terminal and the C terminal are connected by the main winding 727. The S terminal and the C terminal are connected by the auxiliary winding 728.

The AC power source 90 and the compressor 100 are connected by power supply lines 901 and 902 that supply an AC voltage to the compressor 100. The power supply line 901 is connected to the C terminal via a thermostat 26.

The thermostat 26 detects a temperature of a room equipped with the air conditioner 1. The thermostat 26 opens the contact thereof when the room temperature is within a set temperature range and closes the contact when the room temperature is out of the set temperature range.

The power supply line 902 branches off into a first branch line 902A and a second branch line 902B. The first branch line 902A is connected to the M terminal, and the second branch line 902B is connected to the S terminal via an activation circuit 20.

The activation circuit 20 is a circuit in which a positive temperature coefficient (PTC) thermistor 21 and an operation capacitor 22 are connected in parallel to each other.

In this embodiment, the thermostat 26 connected to the power supply line 901 and the activation circuit 20 connected to the power supply line 902 are referred to as the connection unit 30.

(6-3) Operation

In the operation circuit of the compressor 100 having the above-described configuration, turning on of the AC power source 90 causes a current to flow through the auxiliary winding 728 via the PTC thermistor 21 and the motor 70 to be activated.

After the motor 70 has been activated, the PTC thermistor 21 self-heats by using the current flowing therethrough, and the resistance value thereof increases. As a result, the operation capacitor 22, instead of the PTC thermistor 21, is connected to the auxiliary winding 728, and the state shifts to a stable operation state.

(6-4) Features

6-4-1

In the air conditioner 1 that uses a refrigerant mixture containing at least 1,2-difluoroethylene, the compressor 100 can be driven without interposing a power conversion device between the AC power source 90 and the motor 70. Thus, it is possible to provide the air conditioner 1 that is environmentally friendly and has a relatively inexpensive configuration.

6-4-2

In the air conditioner 1 that uses a refrigerant mixture containing at least 1,2-difluoroethylene, the connection between the auxiliary winding 728 and the activation circuit 20, which is a parallel circuit of the PTC thermistor 21 and the operation capacitor 22, makes it possible to achieve a large activation torque of the motor 70 of the compressor 100.

After the compressor 100 has been activated, the PTC thermistor 21 self-heats and the resistance value thereof increases, the state changes to a state where the operation capacitor 22 and the auxiliary winding 728 are substantially connected to each other, and the compressor 100 is operated at a constant rotation rate (power source frequency). Thus, the compressor 100 enters a state of being capable of outputting a rated torque. As described above, in the air conditioner 1, switching of connection to the operation capacitor 22 is performed at appropriate timing, and thus the efficiency of the compressor 100 can be increased.

6-4-3

The motor 70 is an induction motor and is capable of high output with relatively low cost, and thus the efficiency of the air conditioner 1 can be increased.

(6-5) Modification Example

Figure 5:
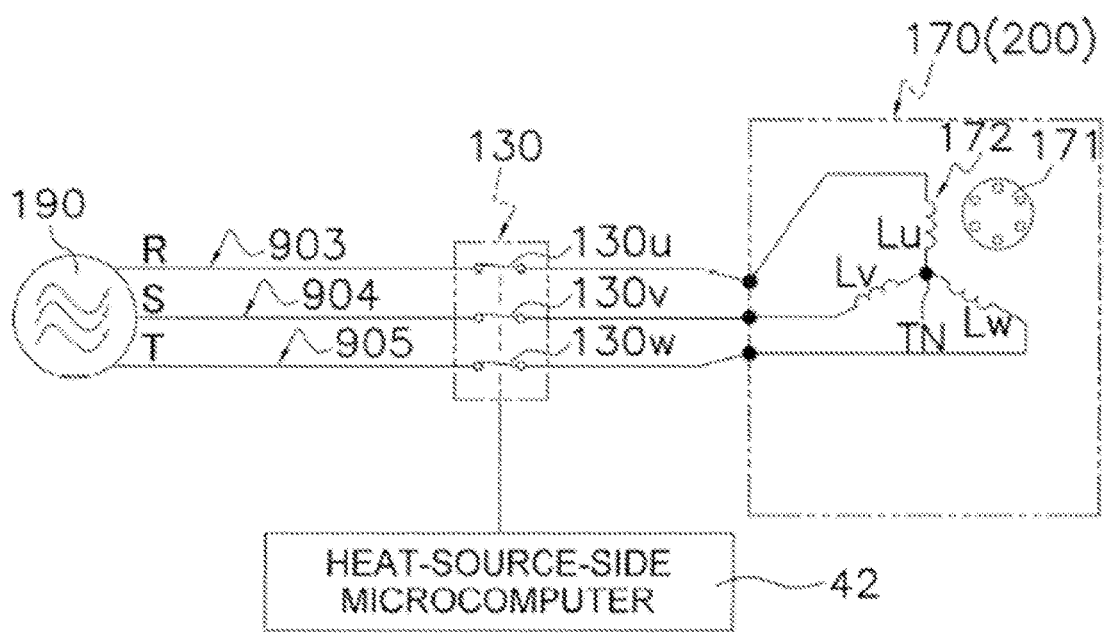
FIG. 5 is an operation circuit diagram of a motor of a compressor in an air conditioner according to a modification example.

FIG. 5 is an operation circuit diagram of a motor 170 of a compressor 200 in the air conditioner 1 according to a modification example. In FIG. 5, the motor 170 is a three-phase induction motor and is connected to a three-phase AC power source 190 via a connection unit 130.

The connection unit 130 is a relay having contacts 130u, 130v, and 130w. The contact 130u opens or closes a power supply line 903 between an R terminal of the three-phase AC power source 190 and a U-phase winding Lu of the motor 170. The contact 130v opens or closes a power supply line 904 between an S terminal of the three-phase AC power source 190 and a V-phase winding Lv of the motor 170. The contact 130w opens or closes a power supply line 905 between a T terminal of the three-phase AC power source 190 and a W-phase winding Lw of the motor 170.

AC voltages are supplied from the R terminal, the S terminal, and the T terminal of the three-phase AC power source 190 to the corresponding U-phase winding Lu, the V-phase winding Lv, and the W-phase winding Lw of the motor 170. The AC voltage supplied to the V-phase winding Lv of the motor 170 has a phase difference of 120 degrees with respect to the AC voltage supplied to the U-phase winding Lu. Also, the AC voltage supplied to the W-phase winding Lw of the motor 170 has a phase difference of 120 degrees with respect to the AC voltage supplied to the V-phase winding Lv.

Thus, only the supply of AC voltages from the three-phase AC power source 190 to the motor 170 causes a rotating magnetic field to be generated in the stator 172, and the rotor 171 rotates following the rotating magnetic field. As a result, the compressor 200 is operated at a constant rotation rate (power source frequency). Thus, the operation circuit of the motor 170 does not require the activation circuit 20 according to the foregoing embodiment, and only a relay circuit of the connection unit 130 is used.

(6-6) Features of Modification Example 6-6-1

In the air conditioner 1 that uses a refrigerant mixture containing at least 1,2-difluoroethylene, the compressor 200 can be driven without interposing a power conversion device between the three-phase AC power source 190 and the motor 170. Thus, it is possible to provide the air conditioner 1 that is environmentally friendly and has a relatively inexpensive configuration.

The motor 170 is an induction motor and is capable of high output with relatively low cost, and thus the efficiency of the air conditioner 1 can be increased.

An embodiment of the present disclosure has been described above. It is to be understood that various changes of the embodiment and details are possible without deviating from the gist and scope of the present disclosure described in the claims.

REFERENCE SIGNS LIST

1: air conditioner
20: activation circuit
21: positive temperature coefficient thermistor
22: operation capacitor
30: connection unit
70: motor
90: single-phase AC power source
100: compressor
130: connection unit
170: motor
190: three-phase AC power source
200: compressor

CITATION LIST

Patent Literature

PTL 1: Japanese Unexamined Patent Application Publication No. 2013-124848

The invention claimed is:

1. An air conditioner comprising:
a compressor that compresses a refrigerant mixture containing at least 1,2-difluoroethylene;
a motor that drives the compressor; and
a connection unit that causes power to be supplied from an alternating-current (AC) power source to the motor without frequency conversion,
wherein one terminal of the motor is connected in series to an activation circuit.

2. The air conditioner according to claim 1, wherein the connection unit directly applies an AC voltage of the AC power source between at least two terminals of the motor.

3. The air conditioner according to claim 1, wherein the AC power source is a single-phase power source.

4. The air conditioner according to claim 1, wherein the activation circuit is a circuit in which a positive temperature coefficient thermistor and an operation capacitor are connected in parallel to each other.

5. The air conditioner according to claim 1, wherein the AC power source is a three-phase power source.

6. The air conditioner according to claim 1, wherein the motor is an induction motor.

7. An air conditioner comprising:
a compressor that compresses a refrigerant mixture containing at least 1,2-difluoroethylene;
a motor that drives the compressor; and
a connection unit that causes power to be supplied from an alternating-current (AC) power source to the motor without frequency conversion,
wherein the refrigerant is selected from the group consisting of refrigerant (1), refrigerant (2), refrigerant (3), refrigerant (4), and refrigerant (5),
wherein refrigerant (1) comprises trans-1,2-difluoroethylene (HFO-1132 (E)), difluoromethane (R32), and 2,3,3,3-tetrafluoro-1-propene (R1234yf), wherein
when the mass % of HFO-1132 (E), R32, and R1234yf based on their sum in the refrigerant is respectively represented by x, y, and z, coordinates (x,y,z) in a ternary composition diagram in which the sum of HFO-1132 (E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI);
the line segment IJ is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments JN and EI are straight lines,
wherein refrigerant (2) comprises HFO-1132 (E), R32, and R1234yf, wherein
when the mass % of HFO-1132 (E), R32, and R1234yf based on their sum in the refrigerant is respectively represented by x, y, and z, coordinates (x,y,z) in a ternary composition diagram in which the sum of HFO-1132 (E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines,
wherein refrigerant (3) comprises HFO-1132 (E), R32, and R1234yf, wherein
when the mass % of HFO-1132 (E), R32, and R1234yf based on their sum in the refrigerant is respectively represented by x, y and z, coordinates (x,y,z) in a ternary composition diagram in which the sum of HFO-1132 (E), R32, and R1234yf is 100 mass % are within the range of a figure surrounded by line segments ON, NU, and UO that connect the following 3 points:

point O (22.6, 36.8, 40.6),
point N (27.7, 18.2, 54.1), and
point U (3.9, 36.7, 59.4),
or on these line segments;

the line segment ON is represented by coordinates $(0.0072y^2-0.6701y+37.512,\ y,\ -0.0072y^2-0.3299y+62.488)$;

the line segment NU is represented by coordinates $(0.0083y^2-1.7403y+56.635,\ y,\ -0.0083y^2+0.7403y+43.365)$; and the line segment UO is a straight line, wherein refrigerant (4) comprises HFO-1132 (E), R32, and R1234yf, wherein when the mass % of HFO-1132 (E), R32, and R1234yf based on their sum in the refrigerant is respectively represented by x, y, and z, coordinates (x,y,z) in a ternary composition diagram in which the sum of HFO-1132 (E), R32, and R1234yf is 100 mass % are within the range of a figure surrounded by line segments QR, RT, TL, LK, and KQ that connect the following 5 points:

point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;

the line segment QR is represented by coordinates $(0.0099y^2-1.975y+84.765,\ y,\ -0.0099y^2+0.975y+15.235)$;

the line segment RT is represented by coordinates $(0.0082y^2-1.8683y+83.126,\ y,\ -0.0082y^2+0.8683y+16.874)$;

the line segment LK is represented by coordinates $(0.0049y^2-0.8842y+61.488,\ y,\ -0.0049y^2-0.1158y+38.512)$;

the line segment KQ is represented by coordinates $(0.0095y^2-1.2222y+67.676,\ y,\ -0.0095y^2+0.2222y+32.324)$; and the line segment TL is a straight line, and wherein refrigerant (5) comprises HFO-1132 (E), R32, and R1234yf, wherein when the mass % of HFO-1132 (E), R32, and R1234yf based on their sum in the refrigerant is respectively represented by x, y, and z, coordinates (x,y,z) in a ternary composition diagram in which the sum of HFO-1132 (E), R32, and R1234yf is 100 mass % are within the range of a figure surrounded by line segments PS, ST, and TP that connect the following 3 points:

point P (20.5, 51.7, 27.8),
point S (21.9, 39.7, 38.4), and
point T (8.6, 51.6, 39.8),
or on these line segments;

the line segment PS is represented by coordinates $(0.0064y^2-0.7103y+40.1,\ y,\ -0.0064y^2-0.2897y+59.9)$;

the line segment ST is represented by coordinates $(0.0082y^2-1.8683y+83.126,\ y,\ -0.0082y^2+0.8683y+16.874)$; and the line segment TP is a straight line.

8. The air conditioner according to claim 7, wherein the connection unit directly applies an AC voltage of the AC power source between at least two terminals of the motor.

9. The air conditioner according to claim 7, wherein the AC power source is a single-phase power source.

10. The air conditioner according to claim 7, wherein one terminal of the motor is connected in series to an activation circuit.

11. The air conditioner according to claim 10, wherein the activation circuit is a circuit in which a positive temperature coefficient thermistor and an operation capacitor are connected in parallel to each other.

12. The air conditioner according to claim 7, wherein the AC power source is a three-phase power source.

13. The air conditioner according to claim 7, wherein the motor is an induction motor.

* * * * *